United States Patent
Gogolla et al.

(10) Patent No.: US 6,917,415 B2
(45) Date of Patent: Jul. 12, 2005

(54) METHOD OF AND APPARATUS FOR ELECTRO-OPTICAL DISTANCE MEASUREMENT

(75) Inventors: Torsten Gogolla, Schellenberg (LI); Andreas Winter, Feldkirch (AT); Helmut Seifert, Serba (DE)

(73) Assignee: Hilti Aktiengesellschaft, Schaan (LI)

( * ) Notice: Subject to any disclaimer, the term of this patent is extended or adjusted under 35 U.S.C. 154(b) by 78 days.

(21) Appl. No.: 10/284,223

(22) Filed: Oct. 30, 2002

(65) Prior Publication Data

US 2004/0085526 A1 May 6, 2004

(30) Foreign Application Priority Data

Mar. 16, 2001 (DE) .......................................... 101 12 833

(51) Int. Cl.$^7$ ................................................ G01C 3/08
(52) U.S. Cl. ................... 356/5.06; 356/5.01; 356/5.02; 356/5.03; 356/5.15
(58) Field of Search .............................. 356/4.01, 5.01, 356/5.02, 5.03, 5.06, 5.09, 5.15

(56) References Cited

U.S. PATENT DOCUMENTS

| | | | | |
|---|---|---|---|---|
| 4,083,380 A | * | 4/1978 | Huber | 356/5.11 |
| 4,297,030 A | * | 10/1981 | Chaborski | 356/5.13 |
| 4,692,023 A | * | 9/1987 | Ohtomo et al. | 356/5.11 |
| 4,770,526 A | * | 9/1988 | Manhart et al. | 356/5.07 |
| 5,162,862 A | * | 11/1992 | Bartram et al. | 356/5.15 |
| 5,291,262 A | * | 3/1994 | Dunne | 356/5.06 |
| 5,510,890 A | * | 4/1996 | Langdon et al. | 356/5.09 |
| 5,710,621 A | * | 1/1998 | Tamura | 356/5.15 |
| 6,429,941 B1 | * | 8/2002 | Kamon et al. | 356/614 |
| 6,469,778 B2 | * | 10/2002 | Asaka et al. | 356/28.5 |

* cited by examiner

*Primary Examiner*—Bernarr E. Gregory
*Assistant Examiner*—Brian K Andrea
(74) *Attorney, Agent, or Firm*—Sidley Austin Brown & Wood, LLP

(57) ABSTRACT

A method of and an apparatus for an electro-optical distance measurement in which a laser beam of a laser diode (1) is directed as an intensity modulated train of emitted light pulses onto an object, the reflected measurement pulse train (10) is detected by a light detector (6), which generates, in response to the detection of a measurement pulse train, a first photo-current component, a smaller portion of the intensity modulated pulse train is branched out as a reference pulse train and, after passing a known reference path, is also detected by the light detector (6), which generates in response to this detection a second photo current component, and the light detector converts the measurement pulses, together with a mixer pulse train generated by a local oscillator, into a comparatively low-frequency IF-region that determines, after a corresponding conversion, the measured distance.

112 Claims, 14 Drawing Sheets

METHOD OF AND APPARATUS FOR ELECTRO-OPTICAL DISTANCE MEASUREMENT

BACKGROUND OF THE INVENTION

1. Field of the Invention

The present invention relates to a method of an electro-optical distance measurement. In particular, a laser beam is directed onto a measured object and a measurement light beam is reflected from the object and detected by a light detector, with the distance to the object being determined by a calculation of the light propagation time between the light emitter and the light detector.

The present invention also relates to an apparatus for an electro-optical measurement including a light emitter for emitting a laser beam directed to the measured object; a light detector for detecting the measurement light beam reflected from the object, wherein the measurement light beam is transmitted thereto by a receiving optics; and a control unit that processes the signal received by the light detector, after the signal was pre-processed and subjected to an A/D conversion, for determining the measured distance based on the light propagation time between the light emitter and the light detector.

2. Description of the Prior Art

Measurement of distances up to several hundred meters with a precision of several millimeters is of great importance in many applications, in particular in the construction industry and tero-technology industry. The dynamics of the measurement systems should be high to process both extremely weak and very strong signals. Such a system makes the use of defined cross-hairs superfluous. Distance measurement from technical surfaces without the use of cross-hairs reduces the production time and, thus, reduces the production costs, and simultaneously reduces the production tolerances.

The prior art discloses numerous methods of and apparatuses for electro-optical distance measurement from technical surfaces. In most cases of measurement, preferably, a visible beam of a laser diode is directed onto a surface of a measured object, and a beam, which is reflected from a light spot on the surface from the measurement beam, is detected by a suitable detector, preferably, a photo diode. For large measurement distances and for technical surfaces with very weak surfaces, an APD-diode is primarily used as a light detector.

The advantage of the APD-diode, compared to other photo diodes, is the APD-diode's capability to amplify the photo current that it generates upon application of a light power thereto. This amplification results from a multiplication of charge carriers, in the avalanche zone, of the APD-diode, in which there exists a high electrical field strength. The field strength sharply accelerates the charge carriers, which are generated, in response to the detection of the light beam. Further charge carriers are released from the semiconductor material of the APD-diode because of the high energy state of the generated charge carriers. The release of the additional charges carrier leads to the amplification of the photo current. A high voltage, in the reverse direction, is needed to obtain the high electrical field strength, in the avalanche zone of the diode. This voltage is within a range of 40 to 500 V. Typical amplification factors, of the photo current, are in a range of 10 to 200. These factors largely depend on the semiconductor material (Si, InGaAs), the structure of the photo diode, bias voltage, and temperature. The amplification factor of the APD-diode is largely influenced by manufacturing tolerances.

The intensity of the measuring beam of the laser diode, as a rule, is modulated, i.e., a measuring signal is superimposed on the beam, for measuring large absolute distances. In most cases, a pulsed, sinusoidal, or quasitochastic signal is used, as a measuring signal. Depending on the measurement method used, the signal propagation time from the emitter to the detector via the measured object is determined, directly or indirectly, from the signal emitted by the light emitter, and the signal reflected from the measured object and detected by the detector. In the case of direct determination, the propagation times of the light pulses are evaluated. This method is known as a light pulse propagation time method. In the case of indirect determination, the propagation time is determined based on a phase shift or correlation of the emitted and detected signals. The distance is determined from the propagation time with the speed of light being known. This method, which depends on the method of signal evaluation, is known as a phase propagation time method or a correlation method. The method, during the measurement, with which the object is continuously impinged by a light beam, is called a continuous-wave method. The continuous-wave method includes both the correlation method, in which pseudo noise modulation is used, and the phase comparison method.

A main problem of a precise distance measurement is the elimination of parasitic propagation time changes in the light emitter and/or light detector, which depend on temperature condition, manufacturing process, and aging. The measurement is calibrated with a known reference distance to reduce errors. Different calibration methods are known.

One known method, disclosed in EP 0 701 702 B1 and U.S. Pat. No. 3,992,615, uses a mechanically reversible reference track. With this method, during the first measurement step, a modulated laser beam is directed onto the measured object and, during the second, reference measurement step, the modulated laser beam is directed, e.g., via a tilted mirror or an adjustable light guide, directly to the photo detector. By subtracting measurement distances, all influences of the temperatures and aging on the components of the apparatus and the particularities caused by the manufacturing process are considered. A significant drawback of this method, is the use of movable mechanical components, which reduce the reliability and service life of the entire system.

In other measurement apparatuses of the type described, two detectors are used, a reference light detector and a main light detector, as disclosed in DE 196 43 287 A1, DE 43 28 553 A1, EP 0 610 918 B1, and DE 41 09 844 C1. With these apparatuses, a greater portion of the modulated laser beam is directed onto the measured object, with the reflected light being directed to the main light detector, and a smaller portion of the modulated laser beam being directed directly to the reference light detector. The reference light detector is constantly illuminated such that no movable mechanical change-over commutator is required. With these apparatuses, parasitic, temperature, aging, manufacture-dependent, propagation time errors associated with the light emitter are completely eliminated. The propagation time errors associated with the receiving components, however, which differ for the measurement and reference branches, remain. Paired photo diodes and/or correction tables are used, as a rule, to reduce the propagation time errors, associated with the receiving components.

Another method of the elimination of propagation time errors involves use of two light emitters and two light detectors, as disclosed in U.S. Pat. No. 4,403,857 and DE 100 06 493. In this method, a portion of the modulated light of the main light emitter is directed onto an object, from which it reaches the main light detector, as a diffused light. Another portion of the modulated light is directed directly to the reference light detector. Additionally, a portion of the modulated light of the reference light emitter is directed directly to the main light detector, while another portion is directed to the reference light detector. Similarly, with this method, no mechanical commutator is needed and all propagation time errors, in both the sender or emitter unit and in the receiving unit, are eliminated. The use of two light detectors and/or two light emitters, however, results in increased costs and a more complicated system.

In some of distance measurement apparatuses, e.g., those used in geodesy, only measurement of relatively large distances (e.g., >10 m) are of interest. In these apparatuses, the measurement and reference signals can be distinguished by a time slot, as disclosed in DE 32 16 313 C2, DE 33 22 145 A1, and EP 0 427 969 A2. Where a reference path is, e.g., 5 cm, a reference signal is detected only 0.17 ns after its emission. When a measured distance is 10 m, the detector detects the measurement signal only 67 ns after its emission. The two signals can be separated from each other because of their different detection time. Such a calibration, as a rule, is used with the light pulse propagation time method. The use of this method has some problems when small distances are measured since the detection times differ by less than 100 ps. The signal processing electronics should be able to directly distinguish these short time differences.

In the indirect phase propagation time method, a sinusoidal, intensity-modulated laser beam is used. The distance is determined by measuring the phase difference between the emitted and detected sinusoidal signals. For calibration, either one reference path, one light emitter, and two light detectors are used, as disclosed in EP 0 701 702 B1 U.S. Pat. No. 3,992,615, or two reference paths, two light emitters, and two light detectors are used, as disclosed in U.S. Pat. No. 4,403,857 and DE 100 06 493. For obtaining a high measurement accuracy, very high modulation frequencies, from 100 MHz to 1 GHz, are used. Because of the high modulation frequency, up to 1 GHz, only small distances, e.g., up to 15 cm, can be unambiguously measured. For an unambiguous determination of a distance, according to DE 100 06 493, the measurement should be effected with at least two modulation frequencies. To ensure a convenient, cost-effective, and substantially disturbance-free signal evaluation, as a rule, the high-frequency receivable signals are converted, into a lower frequency region, using non-linear signal mixing processes.

With the above-discussed method of the signal conversion, APD-diodes are used for effecting direct mixing, as disclosed in DE 196 43 287 A1 and DE 100 37 209.0. In this method, a sinusoidal signal of a local oscillator (LO), with a frequency $f_{LO}$ and an amplitude of more than 1V, is superimposed on a high bias voltage of the APD-diode. Thereby, the amplification factor M of the photo diode, i.e., its inner current source, is modulated by the bias voltage.

The output current of the APD diode is calculated by the following equation $$i_{APD}(t) = M(t) \cdot i_{photo,\, o(t)},$$

Where M(t) is a time-dependent, modulated APD-diode amplification, and $i_{photo,\, o(t)}$ is the inner photo current generated by the detected light. The non-linear relationship between the APD-diode amplification and the inner photo current produces an intermediate frequency signal that oscillates with a frequency difference between the frequency of the local oscillator $f_{LO}$ and the frequency of the modulated, detected light output $f_{Mes}$. The frequency conversion takes place within the inner current source of the APD-diode. The high frequency components are eliminated by low-pass filtration. The output signal of the APD-diode, i.e., the intermediate frequency signal, has a relatively low frequency and, thus, can be conveniently processed. The structural dimensions of the device are typically three to four times smaller than those of conventional modulation wave modulators since the mixing process takes place within the chip of the APD-diode. As a result, parasitic interferences of the electromagnetic interference fields and of the electrical cross-talk are eliminated as much as possible. Furthermore, the noise characteristics are also improved. A reduced interference output results in reduced noise. In addition, the intermediate frequency signal, which is obtained as a result of direct mixing, has a lower frequency compared with the modulation frequency, of the detected light output, e.g., 1 kHz to 100 kHz, such that no disturbing interferences are expected. Parasitic characteristics of electronic components are also eliminated. No high-frequency components are required, in the receiving part of the circuit, except the local oscillator, since the output signal of the APD-diode lies in the intermediate frequency region. Thereby, the costs and the current consumption of the apparatus are substantially reduced. Because of the weak measuring signal, the system has only a very small, interfering, electronic noise and a very weak electrical cross-talk, e.g., less than 110 db, during the signal transmission from the laser diode emitter to the photo diode receiver. Thus, based on the above discussion it is apparent that the method of direct mixing by using an APD-diode has many advantages.

The above-described direct mixing is a heterodyne process since the LO-signal and the measurement signal have different frequencies. The intermediate signal is, thus, an A.C. signal. In a homodyne process, the LO-signal and the measurement signal have the same frequencies. In such a process, the intermediate frequency signal is a D.C. signal. A heterodyne process is primarily used for a high precision distance measurement since the IF-signals, as A.C. signals, are substantially better amplified and processed than D.C. signals. The D.C. signals are subject to a D.C.-offset, which may be greater than the original measurement signal and which is not constant. Offset or operational point fluctuation and flicker noise play a significant role in such a process. As a rule, at low frequencies, flicker noise or 1/f noise increases with the reduction of frequency and dominates. Such noise, however, is substantially eliminated at frequencies above 1 kHz. DE 44 39 298 A1 describes a homodyne process for a three-dimensional measurement of objects. In such a process, the homodyne signal mixing is effected by a two-dimensional intensity modulator. Only relative distances are of interest for such measurements. Accordingly, no ambiguity is present.

In the indirect correlation method, the light emitter is intensity-modulated with a pseudo noise signal, as disclosed in DE 42 17 423 A1 or with a timely, not equidistant pulse train, as disclosed in EP 0 786 097 B1. The emitted and detected signals are shifted in time because of the measured distance. The correlation of both signals provides for a time shift. Equidistant in time or periodical pulses, however, cannot be used since they can lead to ambiguities. In comparison, with the necessary time resolution, e.g., 10 ps for 1.5 mm of distance measurement, the times of the measurement signal changes are relatively large, e.g., 10 ns.

Such necessary high accuracy is achieved by the signal correlation. The measurement band width is narrowed by appropriate correlation integrals.

With known direct light pulse propagation time methods, the measurement beam, which is emitted by a light emitter, is intensity modulated in a pulsed form. The light pulse with a width of e.g., 1 ns is reflected from the measured object and is detected by a light detector. The time between the detection of the reference and the detection of the measurement signal is determined, e.g., by a counter. Then, a next pulse is generated, and the above-described process is repeated. Primarily, the result is obtained after numerous repetitions. At the distance, e.g., of 200 m, for the sake of clarity, the repetition frequency of light pulses should be smaller than 750 kHz. As with the correlation process, this measurement process does not directly require a high time resolution of, e.g., 10 ps which would have been necessary for a single measurement with a precision of, e.g., 1.5 mm. With the available statistical jitter of the laser pulse and the actuation time points of the counter, the rough time resolution of a single measurement is successively improved by averaging the numerous results.

In the method disclosed in DE 33 22 145, the pulse propagation times are first roughly propagation times that are roughly measured first with a counter, which has, at a cycle frequency of, e.g., 1 bHz, a time resolution of only 1 ns. Such an arrangement corresponds to a distance resolution of 15 cm. For measuring the rest time, with each count, a linear voltage ramp, which stops upon detection of the measurement signal, is started anew. The height of the voltage ramp is a measure of the rest time.

In the method disclosed in DE 36 20 226 A1, pulse signals with a repetition frequency from 10 kHz to 150 kHz, which result in an unambiguous measurement after detection and amplification, are processed in a A/D converter and are continuously and timely added to each other in a parallel adder. The continuous addition successively improves the signal-to-noise ratio and the time resolution, as a result of pulse jitter.

EP 0 427 969 A2 describes a variation of the method disclosed in DE 36 20 226 A1. In the method disclosed in EP 0 427 969 A2, when a signal is very strong due to activating a differentiating member, which happens primarily during measurement of short distances, the overflow of the A/D converter is prevented, whereby the measurement accuracy is increased. Thus, for smaller distances, the measurement system is modified.

German patent DE 32 16 313 C2 discloses regulation of the light pulse power with an attenuation filter mechanically displaceable in the beam path. An example of such regulation can be found, in the above described known light pulse propagation time methods.

In the method disclosed in EP 0 610 918 B1, for a distance measurement, short pulse trains are used. After detection, a pulse train excites an electronic resonator adapted to the pulse train frequency. The resonator signal causes the laser to emit a new pulse train. The process is continuously repeated producing a pulse gyration with a predetermined gyration frequency. The distance measurement is determined from the gyration frequency.

Similarly, DE 41 09 844 C1 discloses the above-described known light pulse propagation time method. According to this method, a fiber-optic guide ring with a reference light pulse circulating in the ring is used. With each circulation, a small pulse portion is de-coupled and directed to a detector, which generates a timing signal of a counter. The counter determines the propagation time of the measurement pulse. The method also includes initiation of a reference cycle.

DE 44 39 298 A1 discloses a method of a three-dimensional measurement of objects, which is based on the above-discussed, phase comparison method with a homodyne signal mixing. In the method disclosed in DE 44 39 298 A1 in addition to the phase comparison method, the pulse propagation time method is used, wherein the object is illuminated with a light pulse. A light pulse portion, which is reflected from each point of the measured object, is mapped onto a two-dimensional detector array, e.g., CCD-array, with the aid of a receiving optics. In this way, each detector cell is associated with a certain point of the measured object. In front of the detector array, a two-dimensional optical mixer is arranged, which is also called a spatial light modulator. This light modular, e.g., a Pockets cell, functions as an optical switch. This switch becomes transparent only for a short time and, thus, only provides for passing of a light pulse portion there-through, wherein the propagation time of the pulse is correlated with the time slot of the switch. The transmitted pulse is integrated by predetermined cells of the detector array associated with corresponding points of the measured object. The time slot of the switch is successively shifted-such that, in accordance with the time slot shift, other points of the measured object are integrated. Thus, the measured object can be scanned by the time slot in pieces. The shifting of the time slot corresponds to a two-dimensional correlation or to superimposition of the received signal with the time slot. The repetition frequency of the measuring pulse and of the pulse generated by the time slot are the same. Thus, in the disclosed method, the homodyne signal mixing process is used.

DE 197 04 496 A1 and DE 198 21 974 A1 disclose advantageous embodiments of the measurement method disclosed in DE 44 39 298 A1, and according to which, certain components of the two-dimensional homodyne signal mixing circuit are pre-adjusted.

An article, entitled "Distance Measurement Using a Pulse Train Emitted from a Laser Diode," Japanese J. of Appl. Physics, Vol. 26, No. 10, p.p. L1690 L1692, October, 1987, by K. Seta and T. Ohishi, describes a distance measurement process, in which, a measurement beam of a laser diode is modulated by a train of very short light pulses having a small duty factor. The pulse train consists of a basic frequency of 272 MHz and numerous harmonics. The pulse train reflected from the object is detected with a APD-diode. The first harmonic of the detected pulse train with a frequency of 544 MHz is converted into an IF-region of about 20 kHz by a heterodyne mixing with a sinusoidal LO-signal. Thus, the LO-signal has a frequency of 544.02 MHz. The distance measurement is effected using the first harmonic on the basis of the phase comparison method. The advantage of using the first harmonic as a measurement frequency is the elimination of the cross-talk at the basic frequency of 272 MHz and in the high measurement frequency, which is automatically obtained as a result of a so-called spiking operation resulting from the properties of the laser diode.

The advantage of the sinusoidal intensity-modulation of a laser beam using the signal mixing, according to the phase propagation time method, is that the frequency of the measurement signal is reduced, which ensures a cost-effective, convenient, and substantially disturbance-free and noise-free processing of the signal. As a result, a high accuracy is achieved. In addition, advantageously, the method permits the use of the direct mixing process. It also permits the use of economical components of the telecommunication technology. In the phase time propagation method, the same methods of signal generation and similar frequency regions are used. The drawback of the method, with a continuous process, is that only low amplitudes of the light intensity or the light output can be used to prevent damage of the eye-sight of an operator. The amplitude of the modulated output or power of the laser light should be limited to a maximum of 1 mW. Generally, the measurement accuracy depends on measurement time $T_{Mes}$, the amplitude of the modulated light intensity, and the measurement frequency. A standard deviation of the measurement result is determined from the following equation:

$$\Delta d_{Phase} = Const \sqrt{\frac{3}{8}} \cdot \frac{1}{\pi} \cdot c \frac{1}{P_{LASER,CW}} \cdot \frac{1}{\sqrt{T_{Mes}}} \cdot \frac{1}{\sqrt{f_{Mes}}} = \frac{Const}{1 \text{ mW}} \cdot \sqrt{\frac{3}{8}} \cdot \frac{1}{\pi} \cdot c \cdot \frac{1}{\sqrt{T_{Mes}}} \cdot \frac{1}{\sqrt{f_{Mes}}}, \quad (1)$$

assuming a direct mixing with an ideal mixing efficiency is used.

From the equation (1), it follows that the standard deviation is inversely proportional to the measurement frequency $f_{Mes}$, to the amplitude of the laser output and to the square root of the measurement time $T_{Mes}$. In a complete demodulation, this amplitude corresponds to the mean laser output $P_{LASER, CW}$, which as it has been discussed previously, should not exceed 1 mW to protect the operator's eye-sight.

The main advantage of the light pulse propagation time method is the possibility to use more intensive light pulses while insuring protection of an operator's eye-sight. For short light pulses, less than 18 ns, to ensure the eye-sight protection, the mean light output PLASER, cw should not exceed 1 mW. For an operation with a reliable eye-sight protection, with the maximum possible pulse light output $P_{LASER, CW}$, the following equation applies:

$$P_{LASER,M} = \frac{P_{LASER,CW}}{\eta_{Duty}} = \frac{1 \text{ mW}}{\eta_{Duty}} \quad (2a)$$

with a standard deviation of the measurement result:

$$\Delta d_{pulses} = Const \cdot c \cdot \frac{1}{P_{LASER,1M}} \cdot \frac{1}{\sqrt{2\pi}} \cdot \frac{1}{\sqrt{T_{Mes}\eta_{Duty}}} \cdot t_{Rise} = \frac{Const}{1 \text{ mW}} \cdot c \cdot \frac{1}{\sqrt{2\pi}} \cdot \sqrt{\eta_{Duty}} \cdot \frac{1}{\sqrt{T_{Mes}}} \cdot t_{Rise} \cong \frac{Const}{1 \text{ mW}} \cdot c \cdot \frac{1}{\sqrt{2\pi^3}} \cdot \sqrt{\eta_{Duty}} \cdot \frac{1}{f_L} \cdot \frac{1}{\sqrt{T_{Mes}}}, \quad (2b)$$

where $t_{Rise}$ designates the rise time of the detected pulse of $L \equiv 1/(\pi t_{Rise})$ the 3-dB limited frequency of the system, and $\eta_{Duty}$, the duty factor of the pulse train. The distance measurement accuracy or precision is proportional to the square root of the duty factor $\eta_{Duty}$ of the pulse train and is inversely proportional to the limited frequency $f_L$ of the system. The advantage, which flows from equation (2b), is an increase of the light pulse output by a factor $1/\eta_{Duty}$, which carries more weight than the reduction of the effective measuring time $T_{Eff} = T_{Mes} \cdot \eta_{Duty}$ by a factor $\eta_{Duty}$. This advantage permits an improvement in the signal-to-noise ratio. In comparison with a continuous process, the measurement error is reduced, with the use of the light pulse propagation time method, by a factor:

$$\Gamma = \frac{\Delta d_{pulses}}{\Delta d_{Phase}} = \sqrt{\frac{8}{3}} \cdot \frac{1}{\sqrt{2\pi}} \cdot \sqrt{\eta_{Duty}} \cdot \frac{f_{Mes}}{f_L} \quad (3)$$

For a pulse length of, e.g., $2t_{Rise}=1$ ns and a repetition frequency of, e.g., 750 kHz, the duty factor $\eta_{Duty}=1/1333$, and the limiting frequency of the system $f_L=637$ MHz. When the limiting frequency $f_L$ for the pulse propagation time measurement and the measurement frequency for the phase propagation time measurement $f_{mess}$ are the same, ideally, the measurement error is reduced by a factor $\Gamma=1/55$. The essential drawback of the light pulse propagation time method is the necessity to use gigahertz counters or more rapid scanning circuits, e.g., more than 100 mega samples/sec, which is connected with higher costs resulting, partially, from components that are not readily available. In addition, because the duty factor is very small, which is necessary to obtain unambiguous results, a very high optical pulse output, e.g., several watts, is required. This output can be achieved only with special infrared laser diodes, which are expensive and not readily available. On the one hand, laser diodes emitting non-visible laser beam signal mixing in a region of low repetition frequencies is rather difficult and, on the other hand, such diodes do not provide any significant advantage because of low repetition frequency.

In comparison to the phase propagation time method, the correlation method, in which short, non-periodic, light pulses are used, permits the use of higher optical signal outputs while insuring eye-sight protection. As a result, at the same signal-noise-gap, the total measurement time is reduced, and the effective measurement time decreases due to the pulsed operation. The distance measurement accuracy of the light pulse correlation method is determined by the following equation:

$$\Delta d_{Corr} = Const \cdot c \cdot \frac{1}{\sqrt{2\pi}} \cdot \frac{1}{P_{LASER,CW}} \cdot \frac{T_{Eff}}{T_{Mes}} \cdot \frac{t_{Rise}}{\sqrt{T_{Eff}}} \cong \frac{Const}{1 \text{ mW}} \cdot c \cdot \frac{1}{\sqrt{2\pi^3}} \cdot \frac{1}{f_L} \cdot \frac{\sqrt{T_{Eff}}}{T_{Mes}} \quad (4)$$

The distance measurement accuracy is inversely proportional to the laser signal output $P_{LASER,CW}$. $T_{Mes}/T_{Eff}$ and proportional to the effective measurement time $T_{eff}$ and to the reciprocal square root thereof. The maximum allowable laser signal output again is inversely proportional to the effective measurement time. The effective measurement time is determined as a total duration of the measurement pulse detected during the total measurement time $T_{Mes}$. The signal-to-noise ratio of the light pulse correlation method lies between the signal-to-noise ratio of the phase propagation time method and the signal-to-noise ratio of the pulse propagation time method. The correlation method, in which a pseudo noise modulation is used, as the continuous process, does not have an improved signal-to-noise ratio. As with the light pulse propagation time method, the drawback of the correlation process is the necessity to use rapid scanning circuit, e.g., more than 100 mega samples/sec, which is associated with high costs of component and high costs of signal generation and signal processing. Signal mixing in the low frequency region was not contemplated and would not have been advantageous since non-periodical signals are used.

The object of the present invention is to provide a method of and an apparatus for an electro-optical measurement of comparatively large distances and a measurement from weak reflecting objects without the use of cooperating cross-hairs.

Another object of the present invention is to provide a method of and an apparatus for an electro-optical measurement of comparatively large distances and a measurement from weakly reflecting objects, which are highly reliable and have high measurement precision and, which are inexpensive, while ensuring a high protection of the human eye from being damaged by an electro-optical beam, in particular, a laser beam.

SUMMARY OF THE INVENTION

These objects are achieved by providing a method of an electro-official distance measurement including the steps of directing a laser beam onto a measured effect, detecting a reflected measurement beam with a light detector, and determining a measured distance by measuring a light propagation time, wherein the laser beam is directed onto the measured object in the form of an intensity modulated train of emitted light pulses, and a light component is reflected from the measured object and is detected by the light detector, which generates, in response to the detection, a first photo current component, a small portion of the intensity modulated train of the emitted light pulses is branched out as a reference light pulse train that, after passing a known reference path, is also detected by the light detector, which generates, in response to the detection, a second photo current component, and the measured distance is determined by a propagation time difference between a propagation time of the reference light pulse train passing through the known reference path and a propagation time of a measurement light pulse train passing through a dual measurement distance.

Advantageously, for reliable electronic processing and for economical reasons, only one detector is used, which detects, as a detection pulse train, the reference light pulse train that is superimposed on the measurement light pulse train. However, it is also possible to use separate light detectors for the reference light pulse train and the measurement light pulse train, which form a single unit.

The present invention has a combination of the above-discussed advantages of the phase propagation time method, such as low cost, low intermediate frequency, direct mixing, little noise, and small cross-talk, and the advantages of the pulse propagation time method of which, the comparatively high peak light outputs and good signal-to-noise ratio, are of primary interest. The present invention is particularly suitable for use in laser remote measuring systems for distance measurement, the use of which is safe for the eye-sight, or for use in systems for distance measurement of relative remote and/or weak reflecting objects, without the use of cooperating cross-hairs.

The detection light pulse train, which is detected by a single light detector, or the reference light pulse train and the measurement light pulse train, which are detected by respective light detectors when two light detectors are used, are immediately subject to direct mixing, in respective light detectors, with a subsequent low-pass filtration.

The direct mixing is controlled by a LO-pulse train which is generated by a LO-oscillator provided at the measurement site, which has a duty factor equal to or substantially equal to the duty factor of the measurement light pulse train, and a repetition frequency that is slightly different.

Advantageously, an APD-diode is used, as a light detector, which has an amplification factor that is modulated by a superimposition of the bias voltage of the photo diode with the LO-pulse train.

The repetition frequency of the measurement pulse train is selected within the range of 10 to 400 MHz, particularly, within the range of 50 to 300 MHz and, preferably, 200 MHz. The higher the repetition frequency, the higher the accuracy.

The repetition frequency is a compromise of the cost and advantages. In achieving technical progress, this compromise would be shifted toward higher repetition frequencies. The frequency of 200 MHz corresponds to the present state of the art and is selected in a preferred embodiment of the present invention.

The difference between the repetition frequencies of the measurement pulse train and the LO-pulse train is within the range of 0.5 to 10 kHz, preferably, within the range of 0.8 kHz to 2 kHz, and, particularly, 1 kHz.

As explained below, the efficiency is improved when a small duty factor is used for the measurement light pulse and LO-pulse trains, which is preferably in the range of 1% to 10%, particularly, in the range of 3% to 6%, and specifically 5%. Moreover, the smaller the duty factor, the higher the measurement accuracy. Similarly, the duty factor is a compromise between the cost and the advantages and this compromise will shift in the direction of using smaller duty factors. The duty factor of 5% corresponds to the present state of the art and, in this respect, it is selected for the preferred embodiment of the present invention.

According to the present invention, the apparatus for an electro-optical distance measurement includes a light emitter for directing a laser beam onto a measured object, a detector for receiving a measurement light beam reflected from the measured object, a receiving optics for catching the reflected measurement light beam and directing it as a measurement pulse train to the light detector, a control unit for processing a pre-processed signal emitted by the light detector, after a signal A/D conversion, for determining a measurement distance based on a light propagation time between the light emitter and the light detector, a modulation device for modulating pulses of the laser beam emitted by the light emitter such that the duration of a single emitted pulse is small in comparison to a modulation cycle so that laser beam with a small duty factor, which is pulsed out as an initial pulse train, is emitted toward the measured object, a beam splitter for branching a portion of the emitted, pulsed, initial pulse train as a reference pulse train along a known reference path toward the detector light defector, and a signal mixing device for transforming the reference pulse train passing along the reference path and the measurement pulse train in a common IF-region.

Advantageously, the light detector for receiving the measured pulse train and the light detector for receiving the reference pulse train form a common light detector. The reference pulse train and the measurement pulse train are applied to the common light detector as a superimposed detection pulse train, with a light detection signal being mixed in situ with an emitted LO-pulse train by a local oscillator. A repetition frequency of the LO-pulse train ($f_{LO}$) differs from the frequency of the emitted pulse train ($f_{mes}$) by a small frequency amount such that the reference pulse train and the measurement pulse train are transformed in an IF-range with stretched time scales.

Advantageously, the common light detector is formed by an APD-diode. A bias voltage of the APD-diode is superimposed by the LO-pulse train generated by the local oscillator and is selected so that an amplification factor of the APD-diode is substantially smaller in blanking intervals of the LO-pulse train than during the presence of a LO-pulse.

The invention together with the advantages and objects thereof is best understood from the following detailed description of the preferred embodiments, when read with reference to the accompanying drawings.

DETAILED DESCRIPTION OF THE PREFERRED EMBODIMENTS

Figure 1:
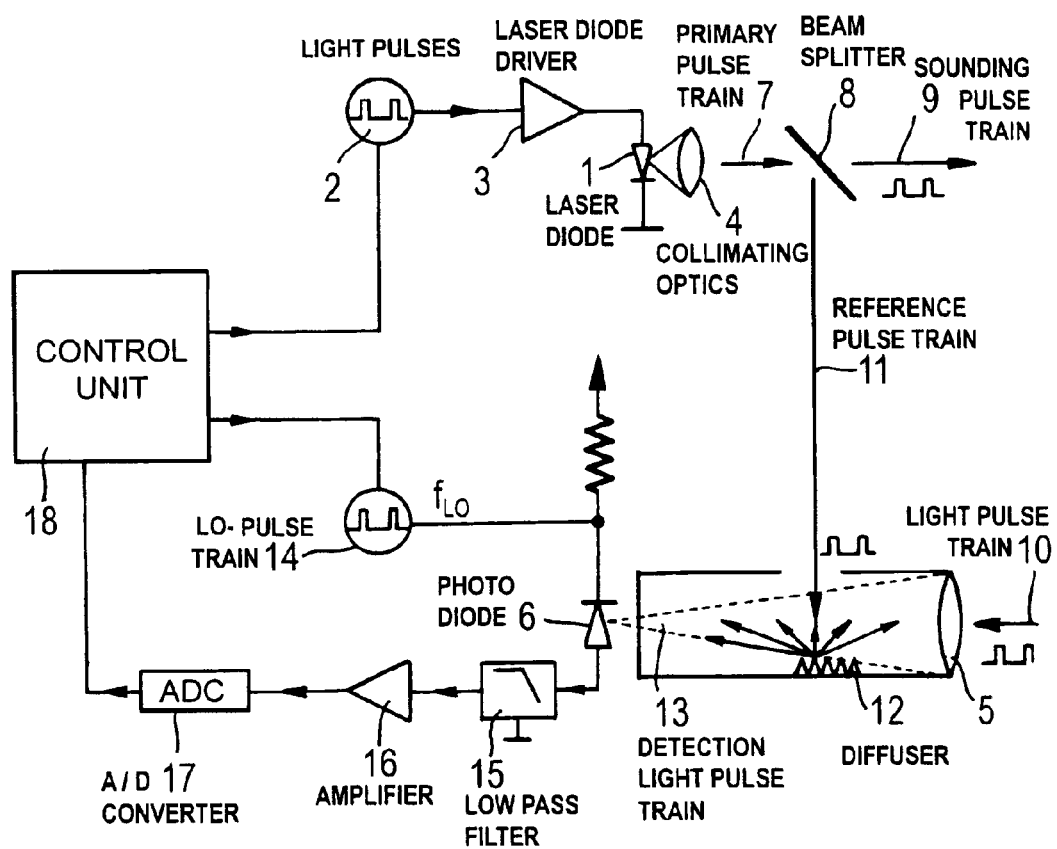
FIG. 1 shows a system layout of a device for an electro-optical distance measurement for effecting the reflection pulse mixing method, according to the invention.

As discussed above, FIG. 1 shows a principle circuit diagram and system layout of a device for effecting a distance-measurement method, according to the present invention. Such a method is called a reflection pulse mixing method.

According to the present invention, the intensity and/or power of a beam emitted by a laser diode 1 are periodically modulated by light pulses 2 from a modulation pulse train. The pulse train is generated by a signal pulse generator (not shown) and is transmitted by a laser diode driver 3 to the laser diode 1. In distinction from a conventional method, in which a light pulse propagation time is used, the method according to the present invention uses pulses with a high repetition frequency of, e.g., 200 MHz or with a small time duration of 5 ns. The duty factor, e.g., is about 5%. Thus, according to the equation (2a), a pulse luminous power of 50 mW can be used with a sight-safe operation of the device. The mean luminous power amounts to 1 mW, and the duration of a single pulse amounts to 100 ps. Due to the high pulse output or power, according to equation (2b), an improved signal-to-noise ratio is obtained resulting in a reduced distance measurement error.

The divergent pulsed modulated light of the laser diode 1 is bundled into a little diverging beam of a primary pulse train by collimating optics 4. This beam passes through a beam splitter 8 and is directed onto a surface of a remote measured object (not shown) as a sounding pulse train 9 generating a light spot on the surface. Advantageously, when a laser diode 1 with a visibly emitted beam (e.g., 635 nm) and a sufficiently high mean light output (e.g., 1 mW) is used, the light spot becomes visible, which makes a precise positioning of the light spot possible. Receiving optics focuses the reflected pulsed, modulated light, which will be referred to below as measurement light pulse train or measurement pulse train 10, from the position of the light spot on an active surface of a photo diode 6. The photo diode 6 generates a first photo current portion corresponding to the measurement light pulse train 10.

A small portion of the pulsed modulated output of the primary pulse train 7 of the laser beam, which will be referred to below as a reference light pulse train or reference pulse train 1, is branched out by the beam splitter 8 or by a light guide and is directed, after passing a known reference path, onto the active surface of the photo diode 6 by a scattering body (diffuser) 12, directly or indirectly. The photo diode 6 generates a second photo current portion corresponding to the reference light pulse train.

The object of the measurement is to determine the length difference between the measurement and reference paths. The length of the measurement path is measured from the site of the laser diode 1 through the position of the light spot on the surface of the measured object to the site of the photo diode 6. Such a determination of the length difference permits complete elimination of, parasitic propagation times of the emitted and received components when the reference path is known. To unambiguously differentiate between reference and measurement pulse trains 11 and 10 such pulses should not be superimposed in time. To achieve this differentiation, a first arriving reference light pulse 11 should die out before the associated measurement pulse 10, which passes through a larger path, reaches the photo diode 6.

From a reference distance and a minimal measurement distance, each of e.g., 5 cm, a length difference of 5 cm is obtained, with the measurement distance being counted twice because the measurement pulse is directed to and from the object. Therefrom, a propagation time difference of 167 ps is obtained. The light pulses, thus, should be smaller than this propagation time difference. Thereby, no superposition takes place.

As discussed above, the photo current generated by the photo diode 6 consists of two portions produced, respectively, by the measurement light pulse train 10 and by the reference light pulse train 11 reflected from the measurement object, with the cumulative signal being designated as a detection light pulse train 13. Because of damping of the measurement signal at large distances and/or of weak scattering surfaces of the measurement object, i.e., with surfaces with a small reflecting power, the first portion, as a rule, is smaller than the second portion. With the assumption that the pulses have a rectangular shape, the detected photo current can be characterized by a Fourier series as follows:

$$i_{Det} = \underbrace{I_M \eta_{Duty} + \frac{2I_M}{\pi} \sum_{n=1}^{N} \frac{\sin(n\pi\eta_{Duty})}{n} \cos(n\omega_{Mes}t - n\omega_{Mes}t_0)}_{\text{measurement pulse train}} + \tag{5}$$

$$\underbrace{I_R \eta_{Duty} + \frac{2I_R}{\pi} \sum_{n=1}^{N} \frac{\sin(n\pi\eta_{Duty})}{n} \cos(n\omega_{Mes}t}_{\text{reference pulse train}}$$

with a radian frequency $$\omega_{Mes} = 2\pi \cdot f_{Mes}, \text{ where} \tag{6}$$

$f_{Mes}$ designates the repetition frequency, i.e., the base frequency of the pulse train, $t_0$ is determined by delay time, which is caused by the length of the measurement distance and N number of detected harmonics. The band width is determined from the equation $$B_{Mes} = N \cdot f_{Mes} \tag{7}$$

t—designates time, $I_M$—pulse amplitude, $I_R$—reference pulse amplitude, and $\eta_{Duty}$—duty factor (duty cycle) of both pulse trains. The photo current pulse amplitudes $$I_M = R \cdot P_M, \text{ and} \tag{8a}$$

$$I_R = R \cdot P_R \tag{8b}$$

are obtained by using a conversion factor R of the photo diode which is proportional to the output of detected light pulses $P_M$ and $P_R$ of the measurement and reference path.

Figure 2:
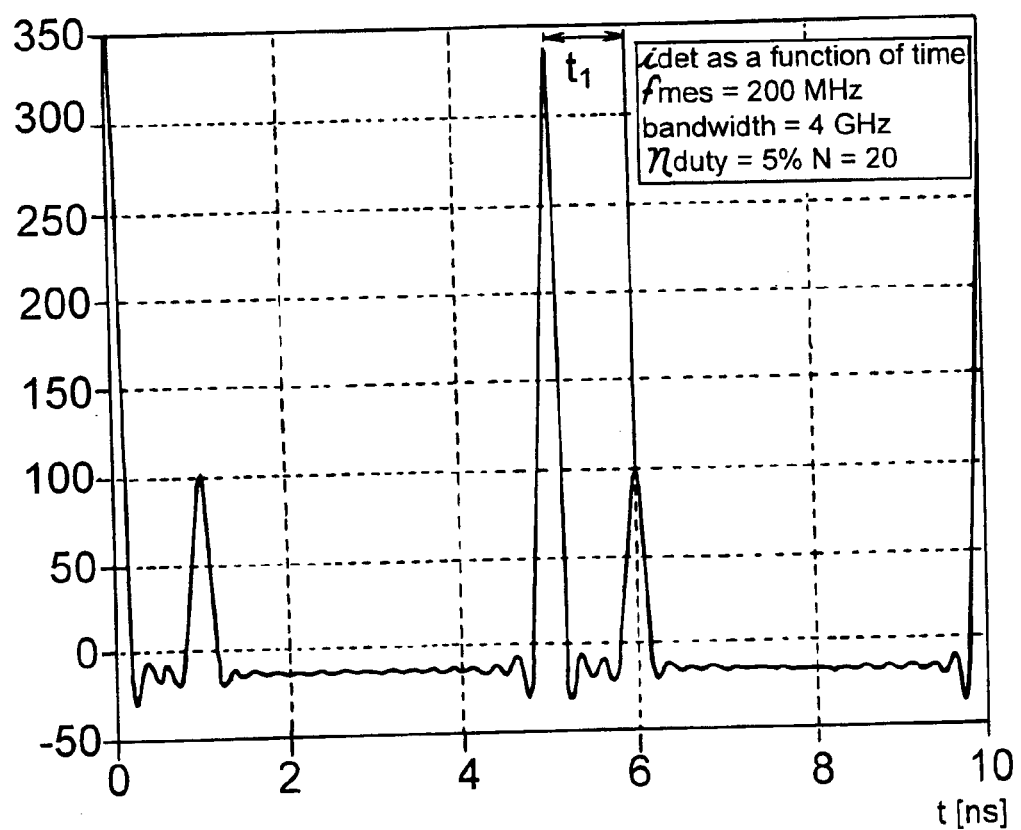
FIG. 2 shows a diagram of a detection pulse train, in the system of FIG. 1, at a site of a light detector, as a function of time for a repetition frequency of 200 MHz, band width of BGz as applied to 20 harmonics at a duty factor of 5%.

FIG. 2 shows a diagram of the detection pulse train $i_{det}$ obtained from the equation (5) as a function of time t. The diagram is based on a duty factor of 5%. Therefore, the pulse duration is a 5% portion of the duration of the pulse train, which in this example is 5 ns. This pulse duration corresponds to a repetition frequency $f_{Mes}$ of 200 MHz. The system band width is 4 GHz. Thereby, N=20 harmonic can be detected. The limited band width permits flattening of the pulse edges. Thus, two portions of the photo current are obtained from the measurement pulse train 10 of the measurement path and the reference pulse train 11 of the reference path. The portion, which is produced by the reference pulse train 11, has a larger amplitude.

Direct detection of pulses with a band width of, e.g., 4 GHz is an expensive, interference-prone, and labor-intensive process. In distinction from conventional methods based on measuring propagation time of light pulses, according to the present invention, a direct mixing method is used.

Figure 3:
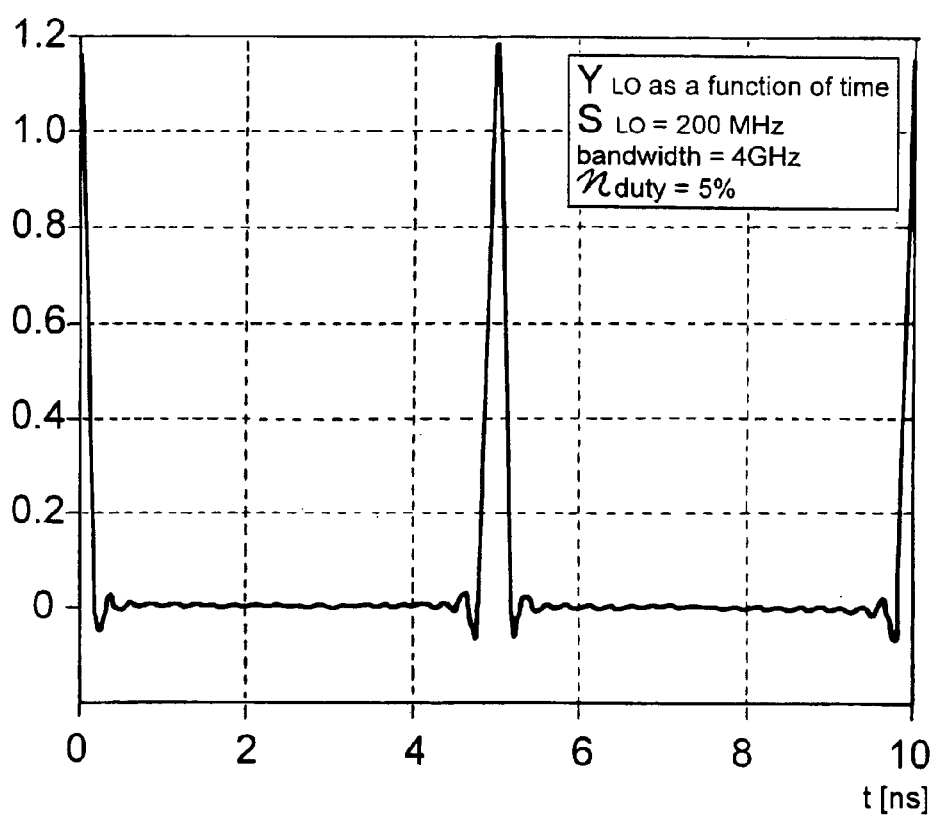
FIG. 3 shows a diagram illustrating a local oscillator (LO) pulse train, in the system of FIG. 1, as a function of time for the repetition frequency of 200 MHz, band width of 4 GHz, as applied to 20 harmonics at a duty factor of 5%.

According to FIG. 1, the reverse voltage $U_{Bias}$ of an APD-diode, which is used as a light detection diode 6, is superimposed by a periodical pulse train with a small duty factor $\eta_{Duty}$ of about 5%, with the amplification factor M of the APD-diode being modulated according to this pulse train. In the system shown in FIG. 1, a pulse train 14 with a repetition frequency $f_{LO}$ is produced by a local oscillator (shown schematically) which is referred to below as LO-pulse generator. The duty factor of the LO-pulse train 14 corresponds, in this example, to the duty factor of the modulation pulse train, i.e., to the duty factor of the measurement or reference pulse train 2. The repetition frequency $f_{LO}$ and $f_{Mes}$ of both pulse trains 14 and 2, however, slightly differ from each other. The reverse voltage $U_{Bias}$ is preferably selected such that without the presence of LO-pulses, a relatively small amplification factor M and, therefore, a small conversion factor R=MK of the APD-diode is obtained, e.g., M=10, R=5 A/W. K describes the sensitivity with which an APD-diode and with which a light wave length of 635 nm usually amounts to 0.5 A/W. With a LO-pulse of a greater duration, M and R values sharply increase, e.g., M=200 and R=100 A/W. Therefore, in accordance with the LO-pulse train 14, the APD-diode 6 is periodically activated. This sharp increase of the conversion factor acts on the inner photo current source of the APD-diode 6 as an actuation signal, which can be characterized, assuming the pulses of the periodical pulse train have a rectangular shape, by a Fourier series $$y_{LO} = \eta_{Duty} + \frac{2}{\pi} \sum_{n=1}^{N} \frac{\sin(n\pi\eta_{Duty})}{n} \cos(n\omega_{LO}t_0), \tag{9}$$

where $$\omega_{LO} = 2\pi \cdot f_{LO} \tag{10}$$

is a radiant frequency of the pulse train of the LO-pulse generator. The band width of the system is $$B_{LO} = N \cdot f_{LO} \tag{11}$$

where N is the number of harmonics considered. The LO-pulse train, i.e., the expression of the equation (9) is shown in FIG. 3, as a function of time. The duty factor amounts to 5%, the repetition frequency to 200,001 MHz, and the system band width to 4 GHz, i.e., N=20 harmonics.

With the described, periodical switching process, the signal from equation (5) is multiplied by the switch signal from the equation (9), whereby after filtering in a low-pass filter 15, an intermediate frequency signal is produced. By multiplication of both Fourier series from the equation (5) and (9) and by using an addition theorem $$\cos(x)\cos(y) = \frac{\cos(x - y) + \cos(x + y)}{2}$$

following equation is obtained $$i_{IF}(t) = lowpassfiltering(i_{det} * y_{LO}) = \tag{12}$$

$$\underbrace{I_M \eta_{Duty}^2 + \frac{2I_M}{\pi^2} \sum_{n=1}^{N} \frac{\sin^2(n\pi\eta_{Duty})}{n^2} \cos(n\omega_{IF} t - n\omega_{Mes} t_0)}_{\text{measurement pulse}} +$$

$$\underbrace{I_R \eta_{Duty}^2 + \frac{2I_R}{\pi^2} \sum_{n=1}^{N} \frac{\sin^2(n\pi\eta_{Duty})}{n^2} \cos(n\omega_{IF} t)}_{\text{reference pulse}}$$

with the intermediate frequency (IF)

$$\omega_{IF} = |\omega_{Mes} - \omega_{LO}| = 2\pi \cdot f_{IF} = 2\pi \cdot |f_{Mes} - f_{LO}| \tag{13}$$

and the band width $$B_{IF} = N \cdot f_{IF} \tag{14}$$

This expression is referred to below as an intermediate frequency pulse train. As a result of multiplication of Fourier series, in addition to the portions of the photo current which, with respect to the frequency, have frequencies equal to whole number multiples of $f_{IF}$, portions of photo current having the frequencies $$|{}^n f_{Mes} - {}^m f_{Lo}| \text{ with } (n,m)=1, 2, \ldots, N \text{ and } n \neq m \tag{15a}$$

and $$|{}^n f_{Mes} + {}^m f_{Lo}| \text{ with } (n,m)=1, 2, \ldots, N \tag{15b}$$

are produced

Figure 4:
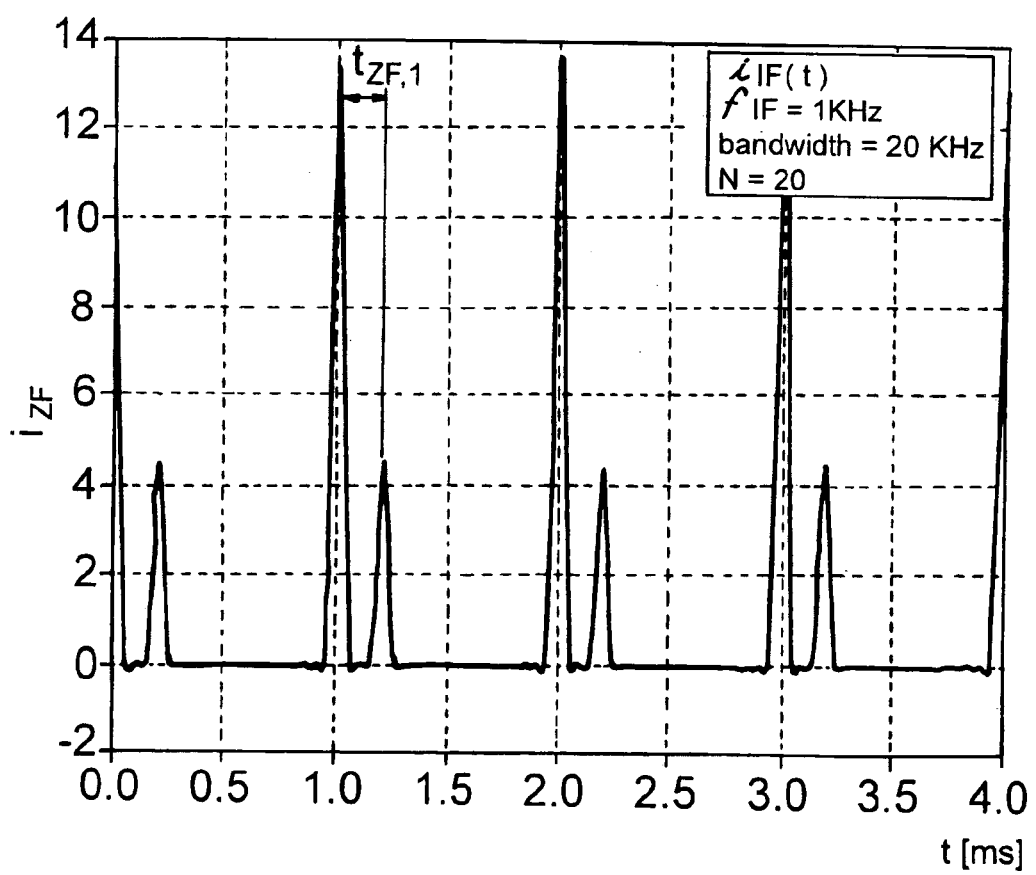
FIG. 4 shows a diagram illustrating a signal diagram for a converted intermediate frequency pulse train at an output of a lowpass filter, in the system of FIG. 1, as a function of time for a repetition frequency of 1 kHz, with a band width of 20 kHz applied to 20 harmonics used as a parameter.
Figure 5:
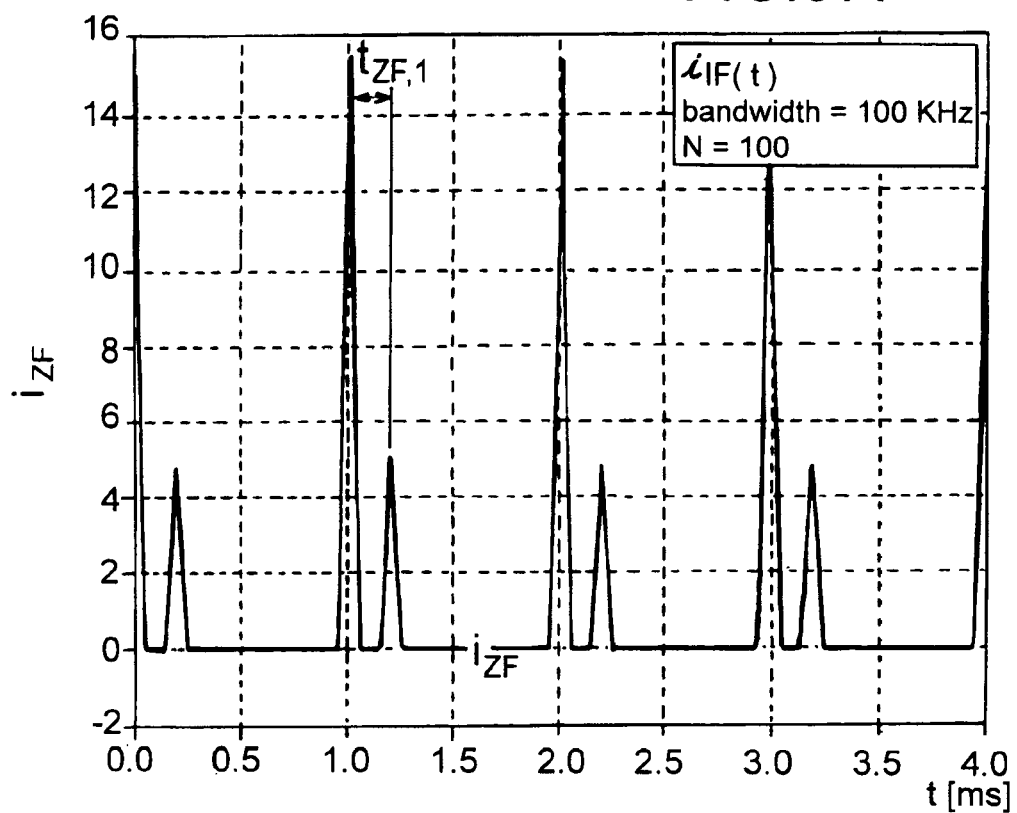
FIG. 5A shows a signal block-diagram of a converted intermediate frequency pulse train, in the system of FIG. 1, as a function of time.
FIG. 5B shows a time-retardation diagram of a converted intermediate frequency pulse train, in the system of FIG. 1, as a function of time for a single measurement pulse with the following parameters: repetition frequency—1 kHz, band width—100 kHz, and 100 harmonics.
Figure 5:
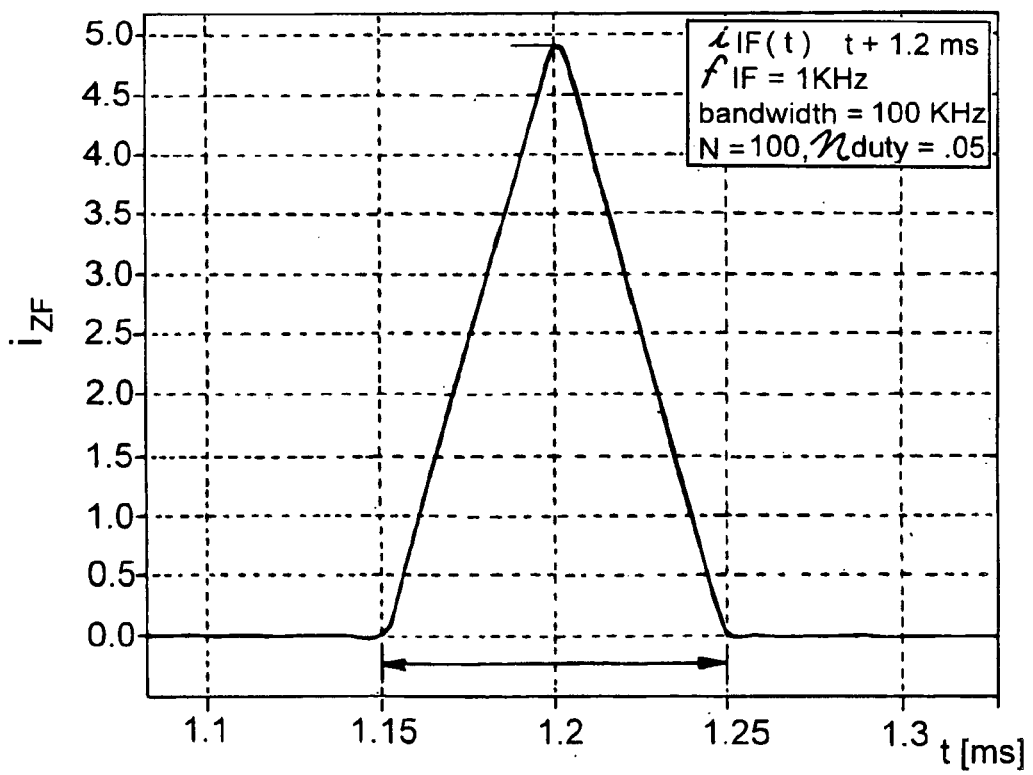
Figure 6:
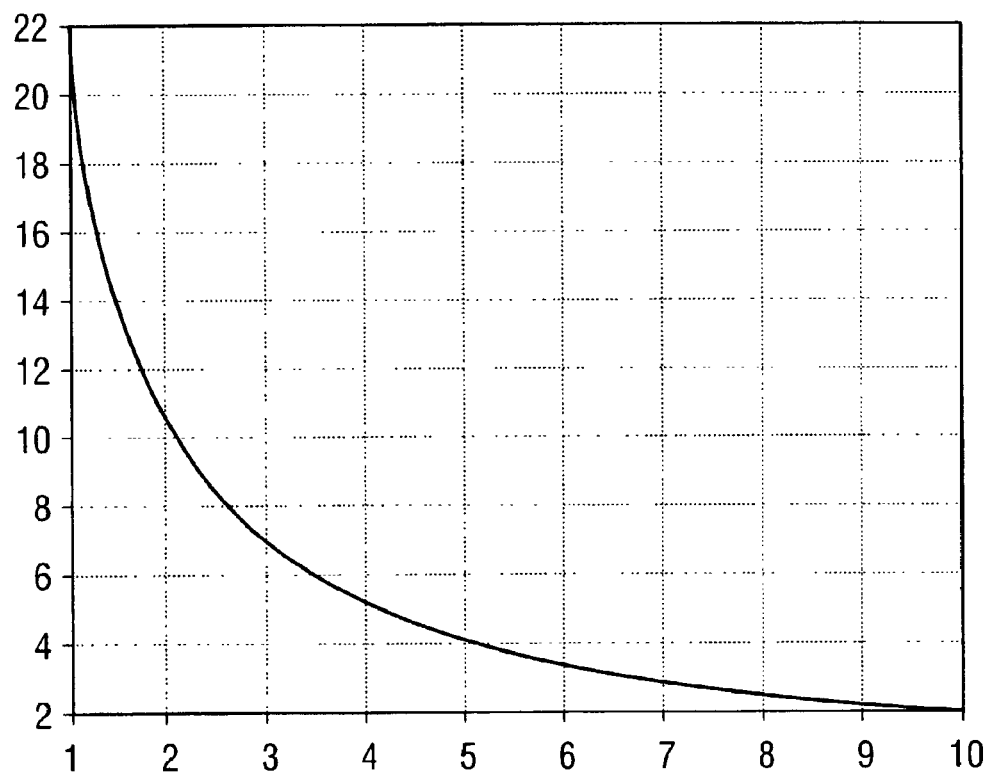
FIG. 6 shows a diagram illustrating the change of a distance measurement error (standard deviation) during a continuous process when the reflection pulse mixing method is used, according to the invention.

These portions have frequencies of about 200 MHz or higher and are eliminated by a low-pass filtering (see FIG. 1). The Fourier series of the equation (12) describes a periodical train of triangular pulses when the duty factors of the pulse trains 2, 14 of the signal—and LO-pulse generator are identical. A single action of the low-pass filter 15 corresponds to one convolution of rectangularity shaped periodical input signals $i_{Det}$ and $Y_{LO}$. FIG. 4 shows a diagram illustrating the change of the IF-signal of the equation (12) as a function of time. The repetition frequency $f_{IF}$ of the IF-signal corresponds to the difference of the repetition frequencies of the $f_{Mes}$ and $f_{LO}$ of the detection and LO-pulse trains. This frequency lies in the range of 1 kHz, taking into account 20 harmonics. The intermediate frequency band width also lies in the region of 20 kHz. The IF-signal $i_{IF}$ like the detection signal $i_{Det}$ also consists of two portions which are produced by the measuring light pulse train 10 of the measurement path and the reference light pulse train 11 of the reference path, respectively. The triangularly-shaped pulses only become noticeable at a larger number of harmonics. FIG. 5A shows a block-diagram of the IF-signal at the IF-band width of 100 kHz and/or at a number of harmonics equal to 100. FIG. 5B shows a section when t is approximately 1.2 ms. The amplitude of a triangular pulse is reduced by a duty factor $\eta_{Duty}=0.05$ in comparison with the amplitude of a corresponding pulse of the detection signal $i_{Det}$. Such a reduction occurs because numerous frequency portions of the equations (15a) and (15b) are eliminated by filtration. The width of the triangular pulse corresponds to the double of the duty factor, i.e., to 10% of the cycle of the intermediate frequency signal of 1 ms.

The intermediate frequency pulse train, as shown in FIG. 1, is amplified in an amplifier 16 and is then transmitted to an A/D converter 17 that transmits the data to a control unit 18 (microcontroller, signal processor, PC). Since the repetition frequencies of the detection pulse train 13 and LO-pulse train 14 differ somewhat from each other, the reflection pulse mixing method, according to the present invention, represents a heterodyne method. The intermediate frequency signal, as a low-frequency alternating signal, can advantageously be amplified and processed further. With this process, there are no excessive noise and operational point weaknesses.

Because of the low intermediate frequency, the A/D converter 17 does not need to meet particular requirements. Therefore, a converter, which is already available in most microcontrollers, is readily used. Such an arrangement reduces operating costs and the costs associated with the design and manufacturing of the operating circuit.

The sampling values of the first measurement obtain the time difference $t_{IF,1}$ 1 between the maxima of the reference and measurement pulses, in IF-signal, according to FIGS. 5A–5B. To improve the signal-noise gap, numerous cycles of the IF-pulse train can be superimposed over each other, whereby a sufficiently strong reference pulse is used as a trigger pulse. The time scale of the detection pulse train is reduced by a direct mixing process with a ratio $f_{IF}:f_{Mes,1}$, where $f_{Mes}$, indicates the repetition frequency of the measurement light pulse train during the first measurement. The time difference $t_1$ between the measurement and the reference pulses in the detection signal, amounts, according to FIG. 2, to $$t_1 = t_{IF,1} \frac{f_{IF}}{f_{mes,1}} \tag{16}$$

In this manner, all of parasitic propagation times of the emitted and receivable components are eliminated due to the time difference obtained between time points of the measurement and reference pulses.

Due to the high repetition frequency $f_{Mes,1}$, a single measurement does not produce any clear measurement distance. With a repetition frequency of 200 MHz, the duration of the pulse train amounts to about 5 ns with a clear region $c/(2 f_{Mes,1})$ of 75 cm, where c is the speed of light in the air. Thus, distances larger than 75 cm cannot be unambiguously measured. The measuring distance is calculated from an equation $$d = t_1 \frac{c}{2} + n_1 \frac{c}{2} \frac{1}{f_{Mes,1}} = t_{IF,1} \cdot \frac{f_{IF}}{f_{Mes,1}} \frac{c}{2} + n_1 \frac{c}{2} \frac{1}{f_{Mes,1}} \tag{17}$$

In the equation (17), n—is the number of cycles which should be added to the distance $t_1$ c/2 to obtain a true distance d. Together with d and $n_1$, there are two unknown values. Therefore, for an unambiguous determination of a distance of an unambiguous range of to-be-measured distances, a second measurement with another repetition frequency $f_{Mes,2}$ should be effected. To obtain a constant intermediate frequency $f_{IF}$, the repetition frequency of LO-pulse train should be changed, in accordance with the repetition frequency of the measurement light pulse or the modulation pulse train 2. For the second measurement, the distance d is characterized by the equation $$d = t_{IF,2} \cdot \frac{f_{IF}}{f_{Mes,2}} \frac{c}{2} + n_2 \frac{c}{2} \frac{1}{f_{Mes,2}} \quad (18)$$

where $t_{IF}$ is a corresponding time difference. The change of the repetition frequency should be such that for both measurements the same absolute number of cycles is obtained, i.e., $n_2=n_1$. Thus, the change in the repetition frequency, which results from the equations (17) and (18), would be $$f_{mes,2} - f_{mes,1} < \frac{1}{2} \frac{c}{d\max^1} \quad (19)$$

where $d_{max}$ is the maximum measurement distance. With a maximum measurement distance of, e.g., 300 m, the maximum repetition frequency change would be 500 kHz. Thus, with $n_2=n_1$, it follows from the equations (17) and (18) that the unambiguous distance would be $$d_o = \frac{c}{2} \cdot f_{IF} \cdot \frac{t_{IF,1} - t_{IF,2}}{f_{mes,2} - f_{mes,1}} \quad (20)$$

However, because of noise, the measured time periods are error-prone. Therefore, under this circumstance, the small difference of the repetition frequencies in the denominator of the equation (20) results in a large distance measurement error. In order to reduce this error, a number of cycles for an ideal case is determined for the unprecise distance $d_o$ based on equations (17) and (18) as follows:

$$n_1 = n_2 = \text{round}\left\{\frac{2}{c} d_o f_{Mes,2} - t_{IF,2} f_{IF}\right\} \quad (21)$$

In an actual case, the number of cycles, because of the noise, would not be a whole number, and it is rounded off, which permits an improvement in the precision of the determination of the measured distance. By inserting $n_1$ from the equation (21) into the equation (17) or (18), a more precise distance measurement is obtained. Because the determination of the distance $d_0$ is error-prone and because of the larger repetition frequency $f_{Mes,2}$, the absolute cycle number that is determined from the equation (21), is rather imprecise. To increase the precision of the determination of the cycle number, the measurement can be conducted with other repetition frequencies, with successively increasing the difference between the frequencies.

The absolute cycle number, in this case, is not determined immediately but rather in several steps, with the relative cycle numbers, i.e., cycle number differences being determined in accordance with the differences between frequencies. These comparatively small cycle number differences are much less error-prone than the absolute cycle number. Thereby, the frequency and cycle number differences, and, thereby, the precision progressively increase until the absolute cycle number can be reliably determined. The precise distance is determined using the last-obtained number.

Because of the periodicity of the pulse signal, a situation can arise during distance determinations when a measuring pulse is superimposed on a reference pulse of a previous cycle. In such a case, the two pulses cannot be separated. In such a case, the repetition frequencies should be adapted to respective data, so that the separation and, thereby, the measurement of the time difference can be effected in the IF-range.

According to the equation (2a), the inventive, reflection pulse mixing method permits selection of a measurement light pulse that is larger by a factor $1/\eta_{duty}$ than the amplitude of the modulated light output of a conventional phase comparison method. By eliminating high-frequency portions using the low-pass filter, in FIG. 1, the inventive reflection pulse mixing method permits reduction of the amplitude of the signal in the IF-range by a factor $\eta_{Duty}$. Thereby, with regard to the signal amplitude in the IF-range, the inventive, reflection pulse mixing method obtains ratios comparable with the known phase comparison method.

An essential advantage of the inventive reflection pulse mixing method, compared with other methods, is that it significantly reduces noise, which is particularly advantageous when APD-diodes are used. In this case, as a rule, a shot noise, which is produced by the background light, dominates. For example, during measurements, in sunlight, the amplification factor M is up to three times bigger than the amplification with all other noise sources. In such a case when the APD-diode is activated only during the duration of the LO-pulse, the mean noise current of the diode is reduced, in the IF-range, in accordance with the duty factor, which improves signal-to-noise ratio at the same signal amplitude. This advantage is useful when using the APD-diode, which operates with a sufficiently large amplification factor. The use of larger magnification factors or higher reverse voltages results in a very sensitive temperature behavior with respect to the signal propagation time. The propagation time errors are completely eliminated even when the magnification factors are very large, because with the inventive reflection pulse mixing method, the reference pulse train and the measurement pulse train pass through the same components in the receiver and the emitter. In the inventive method, the APD-diode operates with a high sensitivity without an adverse effect to the parasitic propagation time errors and noise. With the inventive method, the use of compensation tables for reducing the errors and an initial calibration of the measuring device are eliminated. The shot noise current of the photo diode is mixed together with the signal current and with the switch signal $Y_{LO}$ from the equation (9) and, in this manner, is converted into the IF-range. It should be noted that very high-frequency noise portions are transferred into the IF-range by harmonic components of the Fourier series of the equation (9). The signal and noise currents in the IF-range result in signal-to-noise ratio and, thereby, the distance measurement error. According to the inventive, reflection pulse mixing method, the following equation characterizes the standard deviation of the measured distance $$\Delta d = \frac{\text{const}}{1 \text{ mW}} \cdot \frac{1}{\pi} \cdot \frac{c}{f_{mes,IRM}} \cdot \quad (22)$$

$$\sqrt{\eta_{Duty} \cdot \left[\pi^2 \eta_{Duty}^2 + 2 \sum_{n=1}^{N} \sin^2(n\pi\eta_{Duty})/n^2\right]} \cdot \frac{1}{\sqrt{T_{Mes}}}$$

In order to eliminate shot pulses, the number of harmonics for band widths $B_{IF}$, $B_{Mes}$, and $B_{LO}$ should be at least $$N = \frac{B_{IF}}{f_{IF}} = \frac{B_{MES}}{F_{MES}} = \frac{B_{LO}}{F_{LO}} = \frac{1}{\eta_{Duty}} \quad (23)$$

In comparison with the phase comparison method, the inventive method reduces the measurement error by a factor $$\Gamma = \frac{\Delta d_{Phase}}{\Delta d_{IRM}} = \qquad (24)$$

$$\sqrt{\frac{3}{8}} \cdot \frac{f_{Mes,IRM}}{f_{Mes,Phase}} \frac{1}{\sqrt{\eta_{duty} \cdot \left[\pi^2 \eta_{duty}^2 + 2\sum_{n=1}^{N} \sin^2(n\pi\eta_{duty})/n^2\right]}},$$

assuming that both methods operate with a mean light output of 1 mW. The factor ɜ is determined as a function of the duty factor $0_{duty}$. It is further assumed that the measurement frequency of the phase comparison method $f_{Mes, phase}$ and the repetition frequency $f_{mes,IRM}$ of the inventive process are identical. With a duty factor of 5%, the measurement precision is improved by a factor 4. This improvement is obtained essentially from the reduction of noise of the photo diode and not from an increased signal amplitude, as is the case when a light pulse propagation time method is used. Because of the small information content in the IF-range, the inventive method requires a smaller effective measurement time compared with a continuous process. The distance measurement precision is proportional to the reduced noise current and is proportional to a square root of the measurement time. The noise currents, however, as the signal currents, carry a greater weight.

Figure 7:
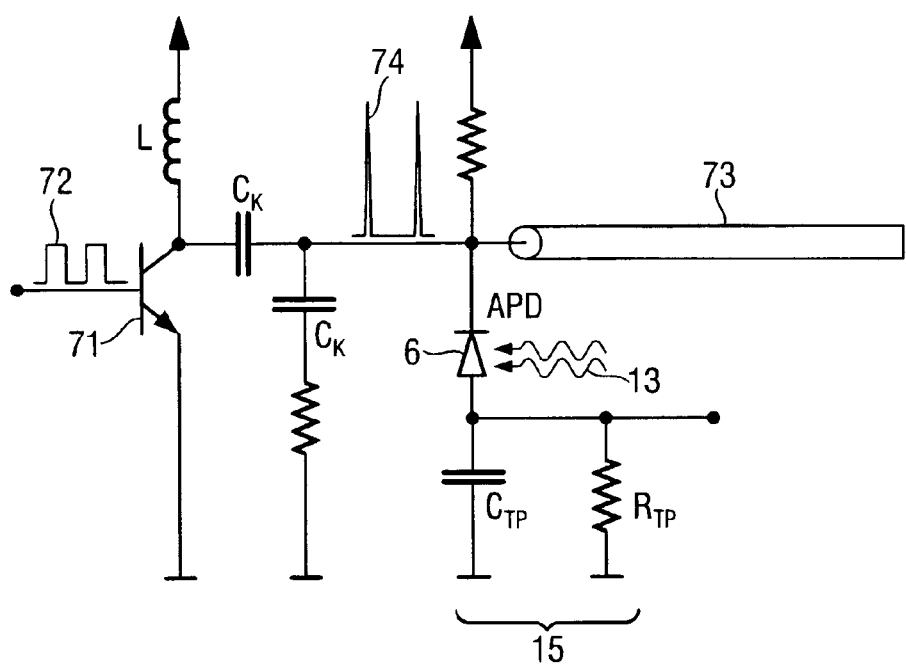
FIG. 7 shows a circuit for generating pulses with a high pulse voltage from a local oscillator signal for modulation of amplification of an avalanche photodiode (APD-diode), according to the invention.

FIG. 7 shows a circuit for generating a periodic train of short voltage pulses for a local oscillator signal for effecting a direct mixing. The pulse voltage of the LO-pulse train 74 should be as high as possible, so that during the pulse duration, the APD-diode 6 has a high magnification factor M, in the 200–1000 range.

In the idle condition, i.e., when the pulses are not applied, the APD-diode 6 is biased in the inverse direction, via a currentless cathode resistance $R_{cathode}$, by a D.C. voltage $U_{bias}$. The bias voltage $U_{bias}$ is selected so that the magnification factor is relatively small in the idle condition, e.g., M<10. Such a voltage results in good switching behavior. A more rapid transistor 71 (FET or bipolar) is controlled by the signal 72 of a square signal generator (not shown) with a frequency of, e.g., 200,001 MHz. At a positive voltage of the switching signal 72, the transistor 71 opens at its base or at the gate, so that a current passes through an inductance L which lies between a supply voltage $U_{supply}$ and the collector (or drain) of the transistor 71. With the falling front of the switching signal 72, the transistor 71 is blocked. Because the steadiness of the current, which passes through the inductance $L_1$, falls across a resistance $R_{match}$, which is larger than the transistor 71 and is arranged parallel thereto, a high voltage pulse is obtained. The pulse propagates through the conductor 73 and at its open end, is reflected with a reflection factor of −1. The reflected pulse and a not yet decayed pulse, which enters the conductor 73, extinguish each other. Thus, the duration of the bias superimposing pulse on the APD-diode 6 is determined by the length of the conductor 73. The resistance $R_{match}$ is used for adjusting the input of the conductor 73, so that multiple reflections are prevented. Capacitors Ck decouple different D.C. voltages. Short pulses can pass therethrough. The switching process caused by the LO-pulse train chops or eliminates the detected periodic pulsed photo current, i.e., the detection pulse train, which has a somewhat different repetition frequency then the LO-pulse train 14. As a result, a low-frequency, periodic, pulsed IF-current is produced. The low-pass filter 15, which consists of capacitor $C_{TP}$ and resistance $R_{TP}$ arranged parallel to each other, short-circuits all high-frequency current portions. For a low-frequency IF-pulse current, the capacitor $C_{TP}$ has a very large reactance. Therefore, the pulsed IF-current quickly passes through the resistance $R_{TP}$ and causes a voltage drop which, if needed, is amplified in the A/D converter 17 (FIG. 1) and is processed further, as discussed above. The advantage of using the APD-diode is its high sensitivity or its large conversion factor. As discussed above, the inventive process increases the signal-noise gap only when the dominated mean noise current is reduced by the duty factor of the LO-pulse train 74, during a short activation of the photo diode 6.

The total noise is determined by the noise of APD-diode because of its high conversion factor. Accordingly, the noise is reduced upon activation of the photo diode 6 which, as it has already been discussed above, is formed as an APD-diode. Therefore, the inventive, reflection pulse method permits signficantly reduces the measurement time and improves the measurement precision. A possible inherent drawback of an APD-diode is its relatively small cut-off frequency which amounts to about 2 $GH_z$, for a conventional silicium APD-diode. The cut-off frequency, however, can be increased by reducing the diameter of the active surface of the APD-diode. For example, by reducing the diameter of the active surface from, e.g., 200 um to 50 um, the cut-off frequency can be increased to above 4 $GH_z$. Further, the required comparatively high voltage of the LO-pulse 74 and of the bias voltage $U_{bias}$ somewhat reduces the reliability. It should be pointed out that the manufacturing of the above-discussed pulse-generating circuit is rather expensive.

Figure 8:
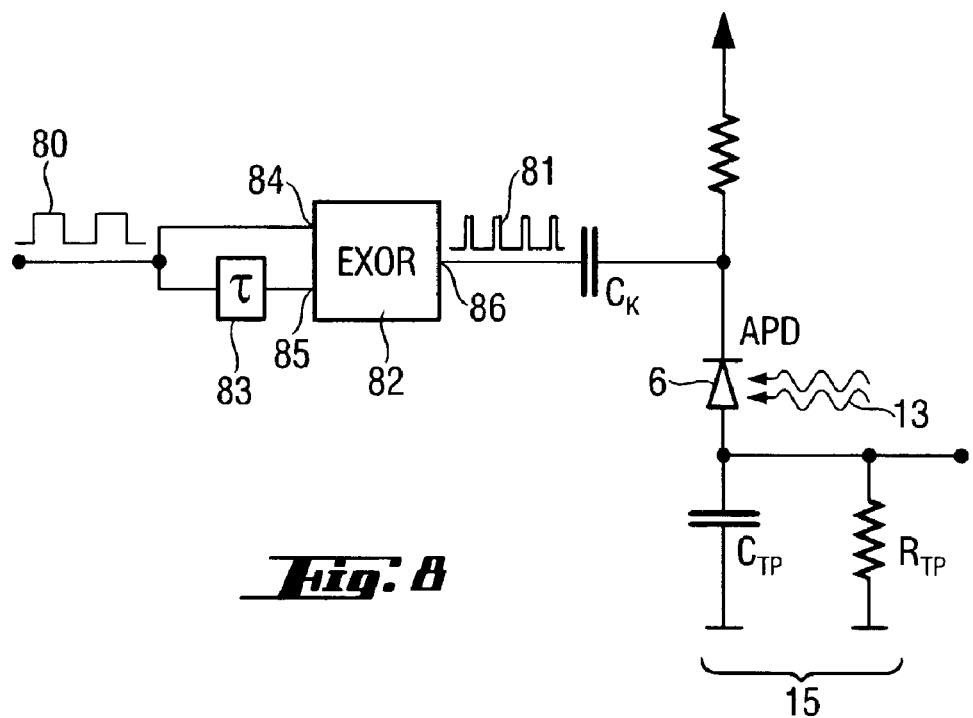
FIG. 8 shows a circuit for generating pulses with a low voltage (several volts) and with an APD-diode at a small duty factor from a local oscillator signal, according to the invention.

FIG. 8 shows another embodiment of a circuit for generating periodic trains of short voltage pulses for producing a LO-signal for direct mixing, in accordance with the reflection pulse mixing method of the present invention. In this embodiment, a periodic LO-pulse train 81 is digitally generated. A signal 80 of a rectangular signal generator (not shown) having a frequency of, e.g., 200,001 $MH_z$, is transmitted, on one hand, directly to an EXOR-gate 82 and, on the other hand, is transmitted to the EXOR-gate 82 via a delay element 83 having a signal propagation time τ. If the input signal has, for a certain time, 0-level or 1-level, then the 0-level or the 1-level is applied to both gate inputs 84, 85, and an 0-level is outputted at the gate output 96. With a rising edge of the input signal 80, immediately, a 1-level is applied to the upper gate input 84. Because of the signal propagation time τ through the delay element 83, a 0-level still prevails at the lower input 85, and a 1-level is outputted at the gate output 86. Only after the delay time τ, when the gate inputs 84 and 85 are under the same conditions, "0" again appears at the gate output 86. A corresponding process takes place with the falling edge of the input signal 80. The pulse duration at the gate output 86 is, thus, determined by the signal propagation time τ of the delay element 83. Because at each edge of the input signal 80, a positive short pulse is generated, the output signal 81 has, in comparison with the input signal 80, a double frequency. A capacitor $C_k$ again decouples different D.C. voltages and is passable for the short pulses of the LO-pulse train 81. The IF-current pulse train, which is generated as a result of the direct mixing of the detected periodic pulsed photo current (detection pulse train 13 in FIG. 1) with the periodic LO-pulse train 81, generates, at the resistance $R_{TP}$ of the low-pass filter 15, a voltage drop corresponding to the IF-current. This voltage drop is measured by the A/B converter 17 and can be processed further. The capacitor $C_{TP}$ short-circuits the high-frequency current components.

Other digital circuits with other logical elements can be used for generating a pulse train. A similar effect can be achieved by using an AND-gate instead of the EXOR-gate 82 and an inverter instead of the delay element 83. For example, a simple conductor can be used as a delay element. In such a case, the signal propagation time would be determined by the conductor length. With gates based on emitter-coupled logics (ECL-logics), rise times of several hundred per second are achieved. By using discrete transistor circuits even more rapid gates can be realized. With GaAs-transistors, rise times of several tens per second can be achieved. In order to further shorten the LO-pulse at the APD-cathode, a drain-off conductor 73 of FIG. 7 can be used, whereby a pulse at the APD-diode 6 is extinguished by a reflected pulse at the conductor end. To prevent multiple reflections, the conductor input should be occluded by a surge impedance of the conductor.

Figure 9:
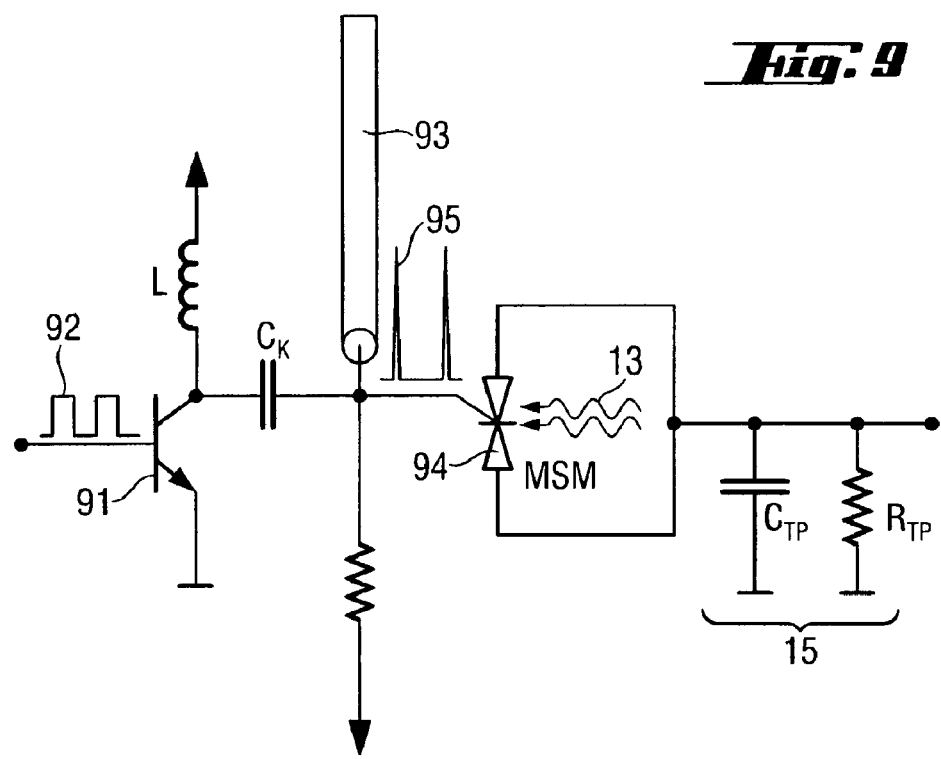
FIG. 9 shows a circuit for generating of short-duration pulse voltages from a local oscillator signal for controlling a MSM-photo diode, according to the invention.

FIG. 9 shows an example of a circuit for generating a periodic train of short voltage pulses for producing the LO-signal for effecting a direct mixing, which corresponds to the method which was discussed with reference to FIG. 7. In this example, the LO-voltage pulse 95 is generated, as discussed above, by the inductance L. As a switch, a rapid transistor 91, which is controlled by a signal 92 of a rectangular pulse generator (not shown) and having a frequency $f_{LO}$=200,001 MHz, for example, can be used. The capacitor $C_k$ again decouples different D.C. voltages. The shortening of the pulse duration results from a drain-off conductor 93 the input of which is connected with resistance R match. The input pulse at the conductor 93 is extinguished by a reflected pulse at its end. In contradistinction from the method, which was discussed with reference to FIG. 7, in the example here, instead of an APD-diode, an MSM-photo diode 94 is used which has a central contact acting as a mixer diode. Without applying a pulse to its cathode, both Schottky-contacts are driven in the conducting direction by a negative voltage source $U_{supply}$ via the resistance $R_{match}$ and the resistance $R_{TP}$ of the low-pass filter 15. As a result, its inner current sources (of the photo current and the short noise current) are short-circuited. Upon application to the cathode of a positive voltage pulse, both Schottky-contacts of the MSM-photo diode 94 would be closed during the duration of the LO-pulse train. In this case, both transistors are photoactive. The photo currents, which are generated on barrier junctions of both transistors by the falling light, flow through the low-pass filter 15, which is formed by the capacitor $C_{TP}$, resistance $R_{TP}$, by the negative voltage source $U_{supply}$, and the resistance $R_{match}$. The generated photo current, which, according to the inventive reflection pulse mixing process, consists of the periodic detection pulse train 13, would be switched on, switched off, or mixed in accordance with the periodic pulse train of the LO-signal 95. Because both pulse trains have somewhat different segregation frequencies, the periodic switching process produces a pulsed IF-current with a repetition frequency corresponding to the difference of the frequencies of the LO-pulse train 95 and the detection pulse train 13. This IF-current produces a voltage drop on the resistance $R_{TP}$ of the low-pass filter 15. The voltage drop can be measured by an A/D converter. The high-frequency current compounds are short-circuited by the capacitor $C_{TP}$. For the IF-current, the capacitor $C_{TP}$ serves as a drain. The advantage of a MSM-photo diode is its high switching speed, with a rise time of, e.g., 10 ps, small activation voltage, e.g., 1 v, high reliability, easy manufacturing and, thus, low costs. A possible drawback may be its low sensitivity so that instead of the shot noises of the active photo diode, noise sources in the IF-section of the circuit dominate. As already discussed above, with the inventive, reflection pulse mixing method, the improvement in the signal-noise gap can only be achieved during a short activation of the photodiode, when the dominating noise current is reduced by the duty factor of the LO-pulse train. Such is the case when an APD-diode is used. In such a case, the total noise is determined by the noise of the diode. When a MSM-photo diode is used, other noise sources dominate and are reduced by short-circuiting the signal at the input of the low-pass filter 15. This short-circuiting is caused by the non-active, drive in the conducting direction, Schottky-contacts of the MSM-diode 94 when no LO-pulse is applied to the cathode. The use of a conversion resistance RT that is as high as possible, in connection with a high-impedance amplifier, is recommended, since with a sufficiently large conversion resistance the thermal noise voltage would dominate. This noise voltage, however, can be reduced by the duty factor using the above-described switching process. Simultaneously, however, a relatively large voltage drop at the low-pass filter resistance $R_{TP}$, i.e., a high IF-signal pulse, should be taken into consideration. The current, which flows through the conducting Schottky-contacts of the MSM-photo diode 94, which in view of the necessary rapid switching behavior, should be as large as possible (e.g., several hundreds pA), generates, on the low-pass filter resistance $R_{TP}$, a D.C. voltage component. This component should be eliminated by using a controlled compensation current source when the conversion resistance is large.

Figure 10:
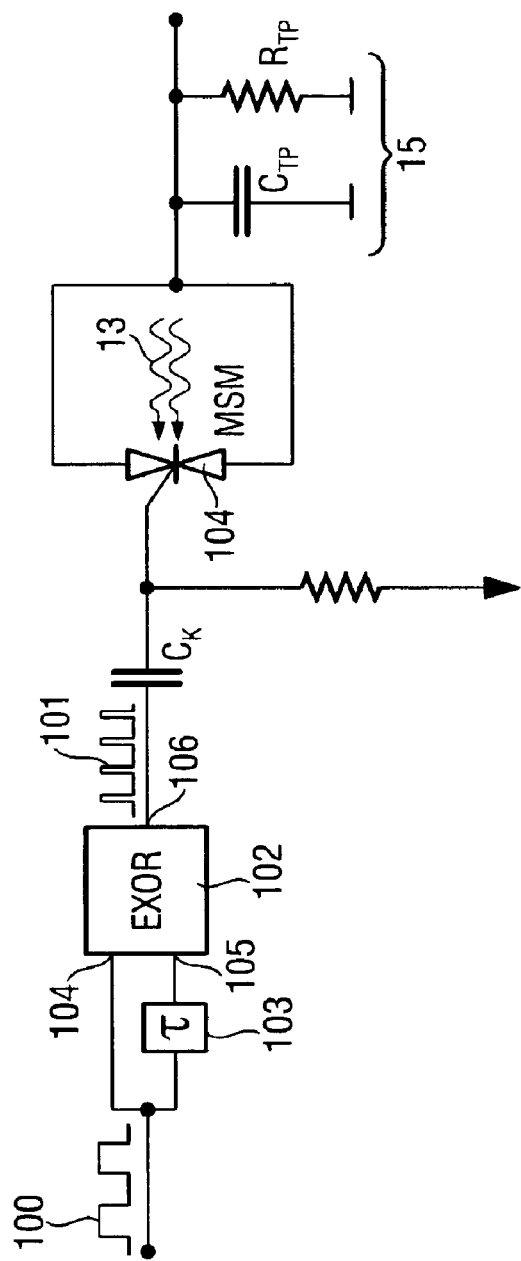
FIG. 10 shows a circuit for generating short-duration pulse voltages with a small duty factor from a local oscillator signal for controlling a MSM-photo diode, according to the invention.

FIG. 10 shows a further embodiment of a circuit for generating a periodic train of short LO-voltage pulses 101 for obtaining a LO-signal and in which, as in FIG. 9, a MSM-photo diode 104 is used for direct mixing. As in the method discussed with reference to FIG. 8, the pulse train is generated by using digital gate elements. In the embodiment of FIG. 10, similarly, an EXOR-gate 102 is used. A rectangular signal 100 of a signal generator (not shown) is fed to an input 109 of the EXOR-gate 102 directly and to an input 105 of the EXOR-gate 102 via a delay element 103. Both at the rising and falling edges of the input signal 100, LO-pulse 101 is provided at the gate output 106 (e.g., with a frequency $f_{LO}$=200,001 MHz) with a positive voltage having a duration determined by the signal propagation time τ of the delay element 103. More rapid EXOR-gates can be formed as ECL-logics or as discrete transistor circuits. When the ECL-gates are used, the rise times of several hundred ps can be reached. The delay element 103 can be formed as a simple conductor. With more rapid GaAs-transistors, rise times of several tens ps can be reached. For generation of a periodic train of short LO-pulses 101 out of the rectangular signal 101, other gate combinations than those shown, in FIG. 10, can be used. The capacitor $C_K$ decouples different voltages. The capacitor $C_K$, however, is passable for short LO-pulses 101. The MSM-photo diode 104 is driven in the conducting direction, in its rest condition, by a negative, voltage source $-U_{supply}$ and the resistances $R_{match}$ and $R_{TP}$ (low-pass filter resistance), whereby both Schottky-contacts of the MSM-photo diode remain inactive. The detected photo current pulse train (the detection pulse train 13) will be mixed in accordance with the LO-pulse train. Thereby, a pulsed IF-current with a low repetition frequency causes a voltage drop at the low-pass filter 15 that is formed of the capacitor $C_{TP}$ and the resistance $R_{TP}$. The voltage drop can be detected with an A/D converter. The high-frequency current components, which are also products of the mixing process, are short-circuited by the capacitor $C_{TP}$.

For signal mixing PIN-photo diodes can also be used. In such a case, however, relatively high LO-voltage pulses become necessary. Further, PIN-photo diode do not obtain as small a switching time as the MSM-photo-diode.

Furthermore, a complex process of manufacturing the PIN-photo diode makes it rather expensive.

Figure 11:
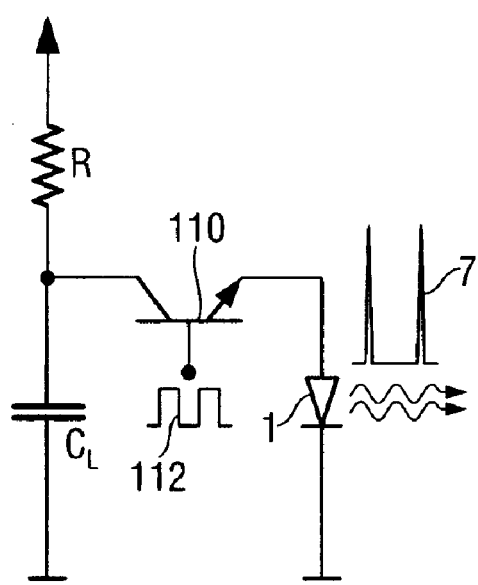
FIG. 11 shows a circuit for generating modulation pulses for a sender-side light emitting diode, in particular, laser diode, according to the invention.

FIG. 11 shows an embodiment of a circuit for generating a periodic train of short current pulses for modulation signal of the laser diode 1. A rapid transistor switch 110, which is produced by using GaAs technology and having a rise time of, e.g., 100 ps, is controlled by a rectangular signal 112 of a rectangular signal generator (not shown). The rectangular signal 112 can have a frequency of, e.g., 200 $MH_Z$ and a rise time of 1 ns. The transistor 110 becomes conductive when a positive half-wave of the rectangular signal is applied thereto. A decoupling capacitor $C_L$ ensures that a strong pulse with a current strength of several amperes is provided by the laser diode 1. When a negative half-wave of the rectangular signal 112 is applied to the transistor 110, it becomes blocked, and the capacitor CL is charged by the voltage source $U_{supply}$ via the resistance R. Due to the spiking-effect, which is explained in FIG. 12, the emitted light pulse or the duty factor of the primary pulse train 7 of the laser diode 1, in FIG. 1, is noticeably shortened in comparison with a current pulse from the transistor 110.

Figure 12:
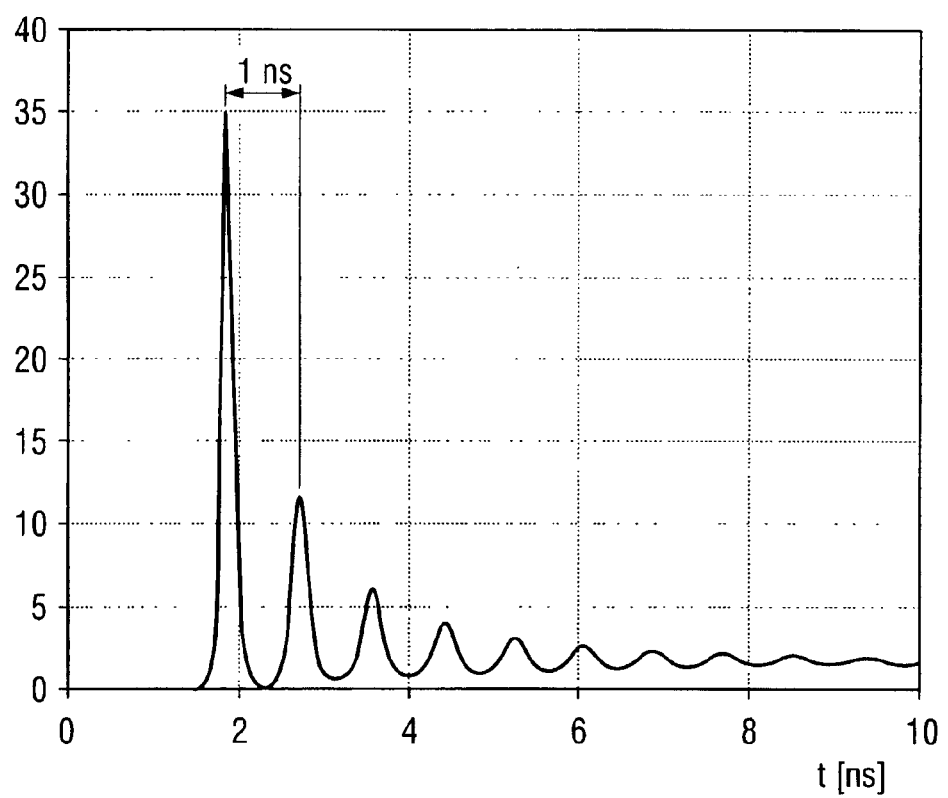
FIG. 12 shows a diagram of a typical transient behavior of a laser diode after a rapid current rise with a rise period of 1 ns, according to the invention.

FIG. 12 shows a typical transient behavior of a laser diode after the initiation of a diode current. After the injection of current, a population inversion is produced in the active laser medium. This population inversion is much stronger than the population inversion, in the transient state, which is obtained after 6 ns. The stronger population inversion results in a time-delayed, rapid and massive discharge of the upper laser level and, as a result, a short intensive light pulse is emitted. The upper laser level is discharged up to the laser threshold. A specific time should pass until the diode current again produces the population inversion, which is weaker than before and which produces a light pulse, which is weaker than before. This process lasts until a transient state is reached. The observed oscillations are called relaxation oscillations. Their duration usually amount to 1 ns. Such oscillations depend on the resonator geometry of the laser diode and are reduced with an increase of the diode current. If the diode current is turned off after the first laser discharge, then only the first, intensive light pulse is emitted. For conventional edge-emitting diodes, this pulse is shorter than the injection current pulse by less than 100 ps, the duration of which amounts, e.g., to 2.5 ns. With vertically emitting laser diodes, even shorter pulses can be obtained. With an increase of the strength of the injection current, the radiation power also increases, and the delay time is reduced. The transient behavior, spiking, of the laser diode generates a train of very short, intensive pulses 7, upon application of the rectangular signal 112 of the signal generator.

Figure 13:
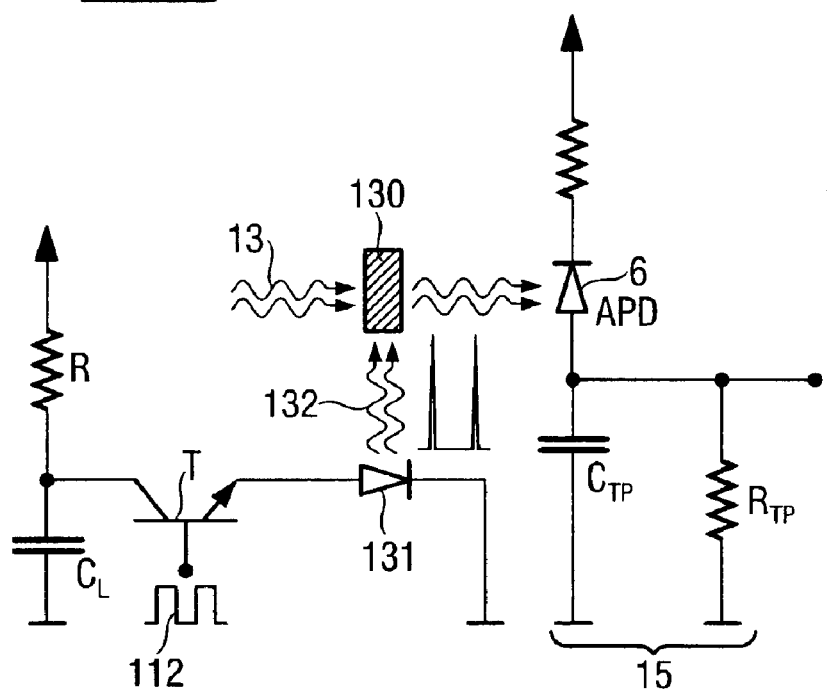
FIG. 13 shows a circuit of device for signal mixing, according to the invention, using optically controlled optical switches.

Other means beside a photo diode can be used for direct mixing of the detection pulse train 13 with LO-pulse train, according to the present invention. For example, as shown in FIG. 13, immediately in front of the photo diode 6, an optical, electrical, or optically controlled switch 130 is arranged through which the detectable light passes and which is actuated by the LO-pulse train 14 (FIG. 1), for mixing the detection light pulse train 13 (FIG. 1). A switch 130, e.g., Pockels cells, which is controlled by electrical signals, can be used. An optical semiconductor amplifier such as, e.g., coated laser diodes, can also be used. Further, the detection pulse train 13, which passes through the amplifying medium, will be strengthened only upon application of an electrical LO-pulse 14, which results in mixing of the detection pulse train 13 with the LO-pulse train 14. With reference to the embodiments of FIGS. 7 and 8, it should be noted that the electrically controlled optical switch or amplifier, which is arranged in front of the photo diode 6, is controlled by the LO-pulse train 14. The photo diode 6 is insulated from the LO-pulse generator. The optical switching or amplification process produces an IF-signal that can tap the low-pass filter 15 formed of the capacitor $C_{TP}$ and the resistance $R_{TP}$. Also, Kerr-cells or a saturable absorber can be used. These elements are actuated with intensive light pulses and, thus, represent optically controlled optical switches. In FIG. 13, the second diode 131 generates the LO-(light) pulse train 132, as a result of the spiking effect described above. The circuit for generating pulses corresponds to the circuit of FIG. 11 that was described above. The periodic LO-light pulse train 132, which is generated by the second laser diode 131, is directed to the optically controlled optical switch 130. Only during the duration of the LO-pulse, the optical switch 130 becomes transparent, and the detection light pulse train 13 can reach the active surface of the photo diode 6. The periodic switching process causes, after the detection, in the photo diode 6, of a IF-current as a pulse train, a correspondence to the IF-current, voltage drop on the low-pass filter 15. The voltage drop is measured by the A/D converter 17 (FIG. 1) and can be further processed by the processor 18.

Optically controlled optical switches result in switch-on times of less than 10 ps. Such switches provide for a small duty factor and thereby result in pulses having a high light output- and are not harmful to the eye. Because of the small duty factor; in accordance with the equation (22), good signal-noise gaps and/or distance measurement precision can be achieved. In addition to the optically controlled optical switches, optically controlled optical amplifiers can be arranged in front of the photo diode 6 mixers. As an optically controlled optical amplifier, a fiber optical amplifier, a dye amplifier, or an optical parametric amplifier can be used. These components amplify the passing detection pulse train 13 dependent on the intensity of the emitted pumping light. With a LO-pumping light pulse, which is generated, e.g., by a laser diode, as a result of the spiking process, optical amplifications of up to $10^6$ can be achieved. Without the pumping light, an attenuation of $10^{-2}$ and $10^{-1}$ are noted. As a result of this large amplification, in accordance with the cycle of the LO-pumping light pulse train, the detection pulse train is mixed with the LO-pulse train. The table 1 below shows switch-on and switch-off transmissions of different optically controlled optical switches or amplifiers.

TABLE 1

Characteristics of optically controlled optical switches or amplifiers

| Type | Switch-on Transmission | Switch-off Transmission | Opening Time |
| --- | --- | --- | --- |
| Kerr-Effect | $10^{-1}$ | $10^{-4}$ | 2 ps |
| Saturable Absorber | $10^{-1}$ | $10^{-4}$ | 10 ps |
| Dye amplifier | $10^{3}$ | $10^{-2}$ | 10 ps |
| Optical Parametric Amplifier | $10^{6}$ | $10^{-1}$ | 0.1 ps |

In principle, slow photo diodes (PIN-, MSM- or APD-diodes) and optical switches and amplifiers can be used because they detect only a low-frequency IF-signal. The shot noise of the photo diode does not dominate when optical switches are used with PIN-or SMS-diodes. Therefore, no improvement in the signal-noise gap can be achieved.

Figure 14:
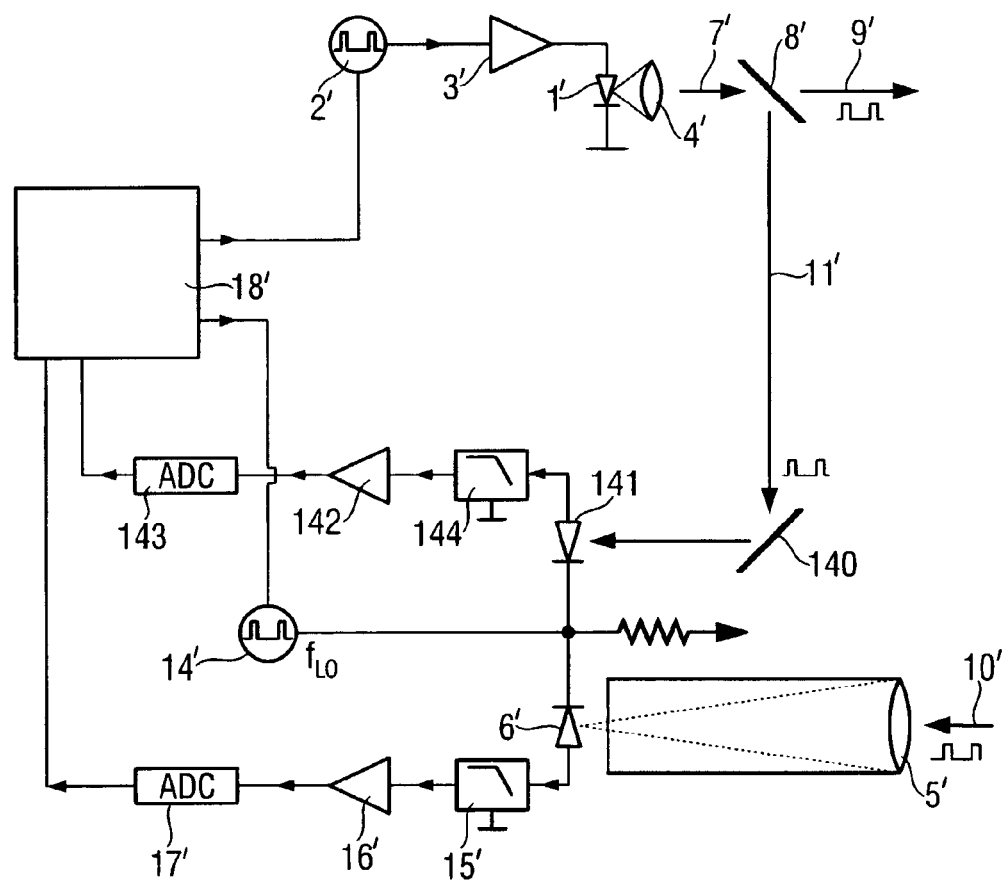
FIG. 14 shows a system layout of another embodiment of a device for effecting the reflection pulse mixing method, according to the present invention, and in which two light detectors are used, according to the invention.

A light detector, when used with a reflection pulse mixing circuit or measuring system, according to FIG. 1, increases the reliability and precision of the system. It is also possible, however, to use a separate reference light detector and a measuring light detector separated therefrom. Such a system is shown in FIG. 14. The system of FIG. 14 substantially corresponds to the system of FIG. 1, which is pointed out by using the same reference numerals but with a prime (') in FIG. 14.

In the system of FIG. 14, the reference light pulse train 11' reaches the photo diode 141 via a second beam splitter or reflector 140 and diffusing medium or an optical wave guide. The measurement light pulse train 10 is focused on the measurement photo diode 6' via receiving optics 5'. The detectable reference light pulse train 11' and the detectable measurement light pulse train 10' are mixed with each other and with the LO-pulse train 14', which is similarly applied to the measuring photo diode 6', as a result of the direct mixing process when photo diodes (PIN-, MSC-, or APD are used or by being mixed by optical switches or amplifiers. The resulting IF-pulse train 14', after being filtered in the low-pass filter 15' or 144, is amplified in an amplifier 16 or 142, and is measured by a A/D converter 17' or 143. the measurement value is transmitted to a control unit 18' that determines the measured distance by evaluating the time difference between the measurement and reference pulse trains, as discussed above.

The advantages of the present invention can be summarized as follows:
(i) By selecting a small duty factor for the measurement and/or modulation pulse train and, thereby for a LO-pulse generator-LO-pulse train, it is possible to obtain relatively high pulse light outputs with small mean noise currents. The result of such an arrangement is
  large signal-noise gaps,
  high distance measurement precision,
  high measurement reliability when determining the number of cycles $n_1$ (see equation (21)),
  little measurement time for reliable determination of the number of cycles $n_1$, and
  high measurement precision at little measurement time.
(ii) In principle, no additional reference receiver is needed with the system layout, of FIG. 1, thereby resulting in the following advantages
  complete elimination of parasitic propagation time periods of emittable and receivable components,
  use of an APD-light detector with a very high amplification,
  high measurement precision,
  high reliability,
  elimination of an initial apparatus-specific calibration, and
  reduction of manufacturing and operational costs.
(iii) Direct mixing according to the present invention results in the following advantages
  low intermediate frequencies, and small sampling frequency,
  elimination of sensitized high-frequency components in the measurement signal path,
  reduced current consumption,
  reduced number of apparatus components,
  simplified circuit design,
  reduction of costs due to the use of low-frequency components,
  absence of or small interference due to electrical interference signals (inductive disturbance, electromagnetic interference caused by digital interference signals or by external radio fields) because of the small intermediate frequency,
  reduced noise because of a small electromagnetic interference and due to the use of low-frequency components, and improved measurement precision.
(iv) Due to the pulse mode of operation of the light emitter (laser diode), the distance measuring apparatus according to the present invention includes
  reduced current consumption,
  low operational temperatures, no cooling is necessary,
  expanded temperature region,
  the use of a low-cost laser diode having a reduced temperature region, and
  an increase in the service life of the laser diodes.
(v) A high repetition frequency of the light pulse used includes the use of reduced light pulse outputs, in comparison with conventional light pulse propagation time methods no special pulse laser diodes are needed.
(vi) It is possible to generate digital signals for producing LO-signals and modulation signals, without any problems.

Though the present invention was shown and described with reference to the preferred embodiments, such embodiments are merely illustrative of the present invention and are not to be construed as a limitation thereof, and various modifications of the present invention will be apparent to those skilled in the art. It is, therefore not, intended that the present invention be limited to the disclosed embodiments or details thereof, and the present invention includes all variations and/or alternative embodiments within the spirit and scope of the present invention as defined by the appended claims.

What is claimed is:

1. A method of electro-optical distance measurement, comprising the steps of:

directing a laser beam onto an object to be measured;

detecting a measurement beam reflected therefrom with a light detector; and determining a distance to be measured by measuring a light propagation time, wherein said laser beam is directed onto said object to be measured as an intensity modulated train of emitted light pulses, and a light component reflected or scattered from said object to be measured as a measurement light pulse train is detected by said light detector which generates, in response to said detection, a first photocurrent component, wherein a small portion of said intensity modulated train of emitted light pulses is branched out as a reference light pulse train that, after passing a known reference path, is detected by said light detector that generates, in response to said detection, a second photocurrent component, wherein said distance is determined by a propagation time difference between a propagation time of said reference light pulse train passing through said known reference path and a propagation time of said measurement light pulse train passing twice said distance—to be measured, and wherein said reference light pulse train and said measurement light pulse train are each subject to a signal mixing employing a mixing pulse train whose repetition frequency deviates slightly from a repetition frequency of said intensity modulated train of emitted light pulses, such that said reference light pulse train and said measurement light pulse train are converted into an intermediate frequency region having stretched time scales.

2. The method of claim 1, wherein the reference light pulse train and the measurement light pulse train are superimposed to form a detection light pulse train detected by the common light detector.

3. The method of claim 1, wherein, for attaining a higher measurement precision, the repetition frequency of the pulse trains is chosen to be higher than that necessary for an unambiguous distance measurement.

4. method of claim 2, wherein the detection light pulse train is subject to signal mixing in a receiver with a subsequent low-pass filtration.

5. The method of claim 2, wherein the detection light pulse train is subject to direct mixing in a light detector with a subsequent low-pass filtration.

6. A method of electro-optical distance measurement, comprising the steps of:
   directing a laser beam onto an object to be measured;
   detecting a measurement beam reflected therefrom with a first light detector; and
   determining a distance to be measured by measuring a light propagation time, wherein
   said laser beam is directed onto said object to be measured as an intensity modulated train of emitted light pulses, and a light component reflected or scattered from said object to be measured as a measurement light pulse train is detected by said first light detector which generates, in response to said detection, a first photocurrent component, wherein
   a small portion of said intensity modulated train of emitted light pulses is branched out as a reference light pulse train that, after passing a known reference path, is detected by a second light detector that generates, in response to said detection, a second photocurrent component, wherein
   a distance is determined by a propagation time difference between a propagation time of said reference light pulse train passing through said known reference path and a propagation time of said measurement light pulse train passing twice said distance to be measured, and wherein
   said first and second light detectors are separate light detectors, and said reference light pulse train and said measurement light pulse train are each subject to a signal mixing employing a mixing pulse train whose repetition frequency deviates slightly from a repetition frequency of said intensity modulated train of emitted light pulses, such that said reference light pulse train and said measurement light pulse train are converted into an intermediate frequency region having stretched time scales.

7. The method of claim 1, wherein said light detector is an avalanche photodiode configured and adapted such that an amplification factor of the avalanche photodiode is modulated via superimposition of said mixing pulse train onto a depletion layer bias voltage of said avalanche photodiode.

8. The method of claim 7, wherein said bias voltage is chosen such that the superimposition of the mixing pulse train yields temporally short, sharp, cyclical increases in said amplification factor.

9. The method of claim 1, wherein a difference between a repetition frequency of said measurement light pulse train and said repetition frequency of said mixing pulse train lies in a range from 0.5 to 10 kHz.

10. The method of claim 1, wherein a repetition frequency of said measurement light pulse train and said repetition lies in a range from 10 to 400 MHz.

11. The method of claim 1, wherein a duty factor of said measurement light pulse train and a duty factor of said mixing pulse train are identical and lie in a range from 1% to 10%.

12. The method of claim 1, wherein a plurality of intermediate frequency pulse trains are superimposed over each other to improve a signal-to-noise ratio, wherein a respective reference pulse of each intermediate frequency pulse train acts as a trigger signal.

13. The method of claim 1, wherein, for determining a true distance of distances to be measured that exceed the range of unambiguity for the frequency given by the operating parameters, a second measurement run is conducted, wherein said repetition frequency of said measurement light pulse train and said mixing pulse train are changed by the same, small amount in terms of their frequency such that, during both measurements, the same absolute number of cycles results within a predetermined, maximal measuring distance ($d_{max}$), the absolute value of which number of cycles is determined via a subsequent rounding process.

14. The method of claim 13, wherein, to increase accuracy and reliability of the determination of the number of cycles, further measurement runs are carried out, wherein relative cycle number or cycle number differences ($n_1-n_x$; x=1, 2, 3 . . . ) are determined in accordance with the further frequency difference values relative to a first selection of repetition frequencies of said measurement light pulse train and said mixing pulse train, until an absolute cycle number can be reliably determined.

15. An apparatus for an electro-optical distance measurement comprising:
   a light emitter for directing a laser beam onto a measured object; a detector for receiving a measurement light beam reflected from the measured object; a receiving optics for receiving the reflected measurement light beam and directing it to the light detector; and a control unit for processing a pre-processed signal emitted by the light detector, after a signal A/D conversion, and for determining a measurement distance based on a light propagation time between the light emitter and the light detector, wherein there is a:
   a modulation device for modulating pulses of the laser beam emitted by the light emitter such that the duration of a single emitted pulse is small compared to a modulation cycle such that a laser beam with a small duty factor is pulsed out as an initial pulse train and is emitted toward the measured object;
   a beam splitter for branching a portion of the emitted, pulsed initial pulse train as a reference pulse train along a known reference path toward a light receiving unit;
   a receiving device including the receiving optics and the light detector for receiving a measurement pulse train reflected from the measured object;
   a signal mixing device for transforming the reference pulse train passing along the reference path and the measurement pulse train into a common IF-region; and
   a signal processing and an evaluating unit including the control unit and determining a propagation time difference between reference pulses and associated measurement pulses and calculating therefrom the measured distance,
   wherein the light detector for receiving the measured pulse train and the light receiving unit for receiving the reference pulse train form a common light detector to which the reference pulse train and the measurement pulse train are applied as a superimposed detection pulse train, whereby a light detection signal is mixed in situ with an emitted LO-pulse train by a local oscillator, the LO-pulse train having a repetition frequency ($f_{LO}$) that differs from the frequency of the emitted pulse train (f mes) by a small frequency amount compared with the repetition frequency of the LO-pulse train such that the reference pulse train and the measurement pulse train are transformed in an IF-region with stretched time scales.

16. An apparatus for an electro-optical distance measurement comprising:
a light emitter for directing a laser beam onto a measured object; a detector for receiving a measurement light beam reflected from the measured object; a receiving optics for receiving the reflected measurement light beam and directing it to the light detector; and a control unit for processing a pre-processed signal emitted by the light detector, after a signal A/D conversion, and for determining a measurement distance based on a light propagation time between the light emitter and the light detector, wherein there is a:
a modulation device for modulating pulses of the laser beam emitted by the light emitter such that the duration of a single emitted pulse is small compared to a modulation cycle such that a laser beam with a small duty factor is pulsed out as an initial pulse train and is emitted toward the measured object;
a beam splitter for branching a portion of the emitted, pulsed initial pulse train as a reference pulse train along a known reference path toward a light receiving unit;
a receiving device including the receiving optics and the light detector for receiving a measurement pulse train reflected from the measured object;
a signal mixing device for transforming the reference pulse train passing along the reference path and the measurement pulse train into a common IF-region; and
a signal processing and an evaluating unit including the control unit and determining a propagation time difference between reference pulses and associated measurement pulses and calculating therefrom the measured distance,
wherein light detection signals that are defined by the measurement pulse train applied to the light detector, and the reference pulse train applied to a light receiving unit, are mixed in situ with an emitted LO-pulse train by a local oscillator, and wherein the LO-pulse train has a repetition frequency ($f_{LO}$) that differs from the frequency of the emitted pulse train ($f_{mes}$) by a small frequency amount compared with the repetition frequency of the LO-pulse train such that the reference pulse train and the measurement pulse train are transformed in an IF-range with stretched time scales.

17. The apparatus of claim 15, wherein the common light detector is an APD-diode with a bias voltage ($U_{bias}$) that is superimposed by the LO-pulse train generated by the local oscillator, and is selected so that an amplification factor (M) of the APD-diode is substantially smaller in blanking intervals of the LO-pulse train than during presence of a LO-pulse.

18. The apparatus of claim 16, wherein each of the light detector and the light receiving unit is a APD-diode with a bias voltage ($U_{bias}$) that is superimposed by the LO-pulse train generated by the local oscillator, and is selected so that an amplification factor (M) of the APD-diode is substantially smaller in blanking intervals of the LO-pulse train than during presence of a LO-pulse.

19. The apparatus of claim 15, further comprising a pulse signal generator for generating a modulation pulse train, and a laser diode acting as a light emitter emitting a light beam in a visible wave length region and receiving the modulated pulse train, wherein the pulse signal generator and the local oscillator are synchronously controlled by the control unit.

20. The apparatus of claim 17, wherein a superimposed signal mix in the APD-diode is conducted through a low-pass filter for removing IF-signal containing a measurement light pulse component and a reference light pulse component.

21. The apparatus of claim 20, wherein the IF-signal is subject to an A/D-conversion and, then, to an algorithmic evaluation for determining the measurement distance.

22. The apparatus of claim 15, further comprising a light diffuser for directing the reference pulse train and the measurement pulse am to the light detector.

23. The apparatus of claim 17, further comprising a pulse-shaping circuit for receiving the LO-pulse train emitted by local oscillator and for converting the LO-pulse train into a spike-pulse train with a very small duration of a single pulse with a very small duty factor.

24. The apparatus of claim 23, wherein the pulse-shaping circuit comprises a switch that is controlled by the LO-pulse train and that has connection tracks extending parallel to the APD-diode and connected via an inductance (L) to a voltage source, whereby a resonance conductor open at one end side is connected with a connection point between the switch, the inductance, and the APD-diode via a matching resistance ($R_{math}$).

25. The apparatus of claim 23, wherein the pulse-shaping circuit is formed by an EXOR-gate controlled by the LO-pulse train applied directly to one gate input and to another gate input, via a delay element, and wherein a delay time ($\tau$), which results from the LO-pulse train passing through the delay element, determines the duty factor for the mixer pulse train to be superimposed on a bias voltage of the APD-diode.

26. The apparatus of claim 15, wherein the common light detector is a series circuit of two light-receiving, Schottky diodes (MSM-arrangement) having cathodes connected to each other, and wherein the LO-pulse train is applied to a common cathode serving as switching pulse train.

27. The apparatus of claim 26, further comprising a pulse-shaping circuit for converting the LO-pulse train into a spike-pulse train with a very small duty factor.

28. The apparatus of claim 27, wherein the pulse-shaping circuit comprises a switch controlled by the LO-pulse train and having connection tracks connected to a first voltage source ($V_{supply}$), via an inductance (L), wherein a resonance conductor open at one side is connected with a connection point between a switch output, inductance, and the common cathode of the MSM-arrangement by a matching resistance, and wherein a second voltage source ($-V_{supply}$) opposite the first voltage source is connected with the connection point via a matching resistance ($R_{match}$).

29. The apparatus of claim 15, wherein the modulation device includes a pulse-shaping circuit for converting the LO-pulse train into a spike-pulse train with a high amplitude and a very short pulse duration.

30. The apparatus of claim 29, wherein the pulse-shaping circuit includes a quick-action switch controlled by a modulation train having connection tracks arranged in series relative to the light emitter, and including a discharge condensator ($C_L$) connected parallel to the light emitter.

31. The apparatus of claim 15, wherein a mixing pulse train, which is necessary for effecting signal mixing of the detection pulse train in the light detector, is applied to the light detector as a light pulse train.

32. The apparatus of claim 16, wherein a mixing pulse train, which is necessary for effecting signal mixing of one of the reference light pulse train and the measurement light pulse train in the light receiving unit and the light detector, is applied to the light detector as a light pulse train.

33. The apparatus of claim 31, further comprising one of an optical switch and an optical amplifier, which is optically controlled by a LO-light pulse train diverted from a local oscillator, for converting at least one of the detection light pulse train, reference light pulse train, and the measurement light pulse train, by mixing the LO-pulse train, in an IF-region with stretched time scales, with IF-pulse trains being detected by the light detector and the light receiving unit.

34. The apparatus of claim 33, wherein one of the optical switch and the optical amplifier is an optical switch, and wherein the apparatus further compromises a further laser diode for directing a switching pulse train to an input of the optical switch, and a pulse-shaping circuit for exciting the further laser diode with a mixer-pulse train emitted by the local oscillator.

35. The apparatus of claim 15, further comprising one of an electrically controlled optical switch and amplifier, which is controlled by the LO-pulse train for converting at least one of the detection light pulse train, reference light pulse train, and the measurement light pulse train by mixing the LO-pulse train, in an IF-region with stretched time scales, with IF-pulse trains being detected by the light detector and the light receiving unit.

36. The method of claim 6, wherein, for attaining a higher measurement precision, the repetition frequency of the pulse trains is chosen to be higher than that necessary for an unambiguous distance measurement.

37. The method of claim 6, wherein the detection light pulse train is subject to signal mixing in a receiver with a subsequent low-pass filtration.

38. The method of claim 6, wherein the detection light pulse train is subject to direct mixing in a light detector with a subsequent low-pass filtration.

39. The method of claim 6, wherein each of said first and second light detectors is an avalanche photodiode configured and adapted such that an amplification factor of the avalanche photodiode is modulated via superimposition of the mixing pulse train onto a depletion layer bias voltage of said avalanche photodiode.

40. The method of claim 7, wherein said bias voltage is chosen such that the superimposition of the mixing pulse train yields temporally short, sharp, cyclical increases in said amplification factor.

41. The method of claim 6, wherein a difference between a repetition frequency of said measurement light pulse train and said repetition frequency of said mixing pulse train lies in a range from 0.5 to 10 kHz.

42. The method of claim 6, wherein a repetition frequency of said measurement light pulse train lies in a range from 10 to 400 MHz.

43. The method of claim 6, wherein a duty factor of said measurement light pulse train and a duty factor of said mixing pulse train are identical and lie in a range from 1% to 10%.

44. The method of claim 6, wherein a plurality of intermediate frequency pulse trains are superimposed over each other to improve a signal-to-noise ratio, wherein a respective reference pulse of each intermediate frequency pulse train acts as a trigger signal.

45. The method of claim 6, wherein, for determining a true distance of distances to be measured that exceed the range of unambiguity for the frequency given by the operating parameters, a second measurement run is conducted, wherein said repetition frequency of said measurement light pulse train and said mixing pulse train are changed by the same, small amount in terms of their frequency such that, during both measurements, the same absolute number of cycles results within a predetermined, maximal measuring distance ($d_{max}$), the absolute value of which number of cycles is determined via a subsequent rounding process.

46. The method of claim 45, wherein, to increase accuracy and reliability of the determination of the number of cycles, further measurement runs are carried out, wherein relative cycle number or cycle number differences ($n_1-n_x$; x=1, 2, 3 . . . ) are determined in accordance with the further frequency difference values relative to a first selection of repetition frequencies of said measurement light pulse train and said mixing pulse train, until an absolute cycle number can be reliably determined.

47. The method of claim wherein said measurement distance is determined using said reliably determined absolute cycle number.

48. The method of claim 46, wherein said distance is determined using said reliably determined absolute cycle number.

49. A method of electro-optical measuring a distance to an object employing an intensity modulated train of emitted light pulses as a light beam, comprising the steps of:

directing a portion of said light beam onto said object;

directing a portion of said light beam through a predetermined reference path as a reference light pulse train;

detecting said reference light pulse train;

detecting a measurement light pulse train comprising a portion of said laser beam reflected or scattered from said object;

subjecting said reference light pulse train and said measurement light pulse train to a signal mixing employing a mixing pulse train whose repetition frequency differs slightly from a repetition frequency of said intensity modulated train of emitted light pulses, such that said reference light pulse train and said measurement light pulse train are converted into an intermediate frequency region having stretched time scales;

generating, responsive to said detection of said reference light pulse train, a first detection signal indicative of a propagation time of said reference light pulse train through said known reference path; and generating, responsive to said detection of said measurement light pulse train, a second detection signal indicative of a propagation time of said measurement light pulse train forth and back said distance;

determining said distance using a propagation time difference between the respective propagation times indicated by said first and second detection signals.

50. The method of claim 49, comprising the step of:

generating said intensity modulated train of emitted light pulses having a first repetition frequency, and wherein all of said steps constitute a first partial measurement; and comprising:

a repetition of said steps as a second partial measurement, wherein said intensity modulated train of emitted light pulses is generated having a second repetition frequency that differs from said first repetition frequency.

51. The method of claim 50, wherein said second partial measurement is effected temporally sequentially to said first partial measurement.

52. The method of claim 50, wherein said repetition frequency of said intensity modulated train of emitted light pulses and/or said repetition frequency of said mixing pulse train is constant during a partial measurement.

53. The method of claim 50, wherein a difference between the repetition frequency of said mixing pulse train during said first partial measurement and the repetition frequency of said mixing pulse train during said second partial measurement is identical to a difference between said first repetition frequency and said second repetition frequency.

54. The method of claim 49, wherein
said measurement light pulse train and said reference light pulse train are collectively detected,
said measurement light pulse train and said reference light pulse train are collectively subject to said signal mixing, and
said first and second detection signals are comprised in a common detection signal.

55. The method of claim 54, wherein said signal mixing is effected at a light detector at which said reference light pulse train and said measurement light pulse train are collectively detected.

56. The method of claim 54, wherein said signal mixing is effected along a common path of said measurement light pulse train and said reference light pulse train anterior to said light detector.

57. The method of claim 54, comprising the step of subjecting said common detection signal to low-pass filtering.

58. The method of claim 49, wherein said measurement light pulse train is detected separately from said reference light pulse train.

59. The method of claim 58, wherein said signal mixing is effected at a respective light detector at which said reference light pulse train/said measurement light pulse train is detected.

60. The method of claim 58, wherein said signal mixing is effected anterior to a respective light detector at which said reference light pulse train/said measurement light pulse train is detected.

61. The method of claim 58, comprising the step of respectively subjecting said first and second detection signals to low-pass filtering.

62. The method of claim 49, comprising the step of generating said intensity modulated train of emitted light pulses by means of a laser diode operating in spiking mode.

63. The method of claim 49, wherein said repetition frequency of said intensity modulated train of emitted light pulses is chosen to be higher than that necessary for an unambiguous measurement of a redetermined maximal measurement distance.

64. The method of claim 49, wherein said step of subjecting said reference light pulse train and said measurement light pulse train to a signal mixing comprises:
applying said mixing pulse train to one or more light detectors such that a signal conversion factor of said light detectors is modulated in accordance with said mixing pulse train and said detected light pulse trains are converted, via impulse mixing with said mixing pulse train in said light detectors, to an intermediate frequency range having a stretched time scale.

65. The method of claim 49, wherein said step of subjecting said reference light pulse train and said measurement light pulse train to a signal mixing comprises:
guiding said reference light pulse train and said measurement light pulse train to one or more respective optical, electrical or optically controlled switches or amplifiers that are activated/deactivated in accordance with said mixing pulse train such that said reference light pulse train and said measurement light pulse train are converted, via impulse mixing with the mixing pulse train, to an intermediate frequency range having a stretched time scale prior to said detection thereof.

66. The method of claim 49, wherein said step of detecting said reference light pulse train and said measurement light pulse train and subjecting same to a signal mixing comprises:
detecting said reference light pulse train and said measurement light pulse train with one or more respective avalanche photodiodes configured and adapted such that an amplification factor of the avalanche photodiode is modulated via superimposition of said mixing pulse train as a voltage impulse train onto a depletion layer bias voltage of said avalanche photodiode.

67. The method of claim 66, wherein said bias voltage is chosen such that the superimposition of the mixing pulse train yields temporally short, sharp, cyclical increases in said amplification factor.

68. The method of claim 49, wherein a difference between said repetition frequency of said intensity modulated train of emitted light pulses and said repetition frequency of said mixing pulse train is chosen from a range of 0.5 to 10 kHz.

69. The method of claim 49, wherein a difference between said repetition frequency of said intensity modulated train of emitted light pulses and said repetition frequency of said mixing pulse train is chosen from a range of 0.8 to 2,0 kHz.

70. The method of claim 49, wherein a difference between said repetition frequency of said intensity modulated train of emitted light pulses and said repetition frequency of said mixing pulse train is chosen to be 1kHz.

71. The method of claim 49, wherein said repetition frequency of said intensity modulated train of emitted light pulses is chosen from a range of 10 to 400 MHz.

72. The method of claim 49, wherein said repetition frequency of said intensity modulated train of emitted light pulses is chosen from a range of 50 to 300 MHz.

73. The method of claim 49, wherein said repetition frequency of said intensity modulated train of emitted light pulses is chosen to be approximately 200 MHz.

74. The method of claim 49, wherein a duty factor of said intensity modulated train of emitted light pulses and a duty factor of said mixing pulse train are chosen to be identical and are chosen from a range of 1% to 10%.

75. The method of claim 49, wherein a duty factor of said intensity modulated train of emitted light pulses and a duty factor of said mixing pulse train are chosen to be identical and are chosen from a range of 3% to 6%.

76. The method of claim 49, wherein a duty factor of said intensity modulated train of emitted light pulses and a duty factor of said mixing pulse train are chosen to be 5%.

77. The method of claim 49, comprising the steps of:
superimposing a plurality of said pulse trains converted to an intermediate frequency over each other to improve a signal-to-noise ratio, and
employing a respective reference pulse of each intermediate frequency pulse train as a trigger signal.

78. The method of claim 49, comprising, for determining a true distance of distances that exceed the range of unambiguity for the frequency given by the operating parameters, the steps of:
conducting a second measurement run, wherein said repetition frequency of said intensity modulated train of emitted light pulses and said mixing pulse train, respectively, are changed by the same, small amount in terms of their frequency vis-à-vis a first measurement run such that, during both measurements, the same absolute number of cycles results within a predetermined, maximal measuring distance ($d_{max}$), and subsequently determining an absolute value of said number of cycles via a rounding process.

79. The method of claim 78, wherein, to increase accuracy and reliability of the determination of the number of cycles, further measurement runs are carried out, wherein relative cycle number or cycle number differences ($n_1-n_x$; x=1, 2, 3 . . . ) are determined in accordance with the further frequency difference values relative to a first selection of repetition frequencies of said intensity modulated train of emitted light pulses and said mixing pulse train, until an absolute cycle number can be reliably determined.

80. The method of claim 79, wherein said distance is determined using said reliably determined absolute cycle number.

81. An apparatus for electro-optical measurement of a distance to an object employing an intensity modulated train of emitted light pulses as a light beam, comprising:

a light emitting means configured and adapted for generating an intensity modulated train of emitted light pulses as a light beam and directing a portion of said light beam onto said object;

a beam splitting means configured and adapted for directing a portion of said light beam through a predetermined reference path as a reference light pulse train;

a first light detecting means configured and adapted for detecting said reference light pulse train and for generating, responsive to said detection of said reference light pulse train, a first detection signal indicative of a propagation time of said reference light pulse train through said known reference path;

a second light detecting means configured and adapted for detecting a measurement light pulse train comprising a portion of said laser beam reflected or scattered from said object and for generating, responsive to said detection of said measurement light pulse train, a second detection signal indicative of a propagation time of said measurement light pulse train forth and back said distance;

a pulse train generating means configured and adapted for generating a mixing pulse train whose repetition frequency differs slightly from a repetition frequency of said intensity modulated train of emitted light pulses;

at least one signal mixing means configured and adapted for subjecting said reference light pulse train and said measurement light pulse train to a signal mixing employing said mixing pulse train, such that said reference light pulse train and said measurement light pulse train are converted into an intermediate frequency region having stretched time scales; and a signal processing and evaluation means configured and adapted for determining said distance using a propagation time difference between the respective propagation times indicated by said first and second detection signals.

82. The apparatus of claim 81, configured and adapted for:
effecting a first partial measurement of said distance, wherein said intensity modulated train of emitted light pulses is generated so as to have a first repetition frequency, and effecting a second partial measurement of said distance, wherein said intensity modulated train of emitted light pulses is generated so as to have a second repetition frequency that differs from said first repetition frequency.

83. The apparatus of claim 82, configured and adapted for effecting said second partial measurement temporally sequentially to said first partial measurement.

84. The apparatus of claim 82, configured and adapted for maintain said repetition frequency of said intensity modulated train of emitted light pulses and/or said repetition frequency of said mixing pulse train constant during a partial measurement.

85. The apparatus of claim 82, configured and adapted for generating said intensity modulated train of emitted light pulses and said mixing pulse train such that a difference between the repetition frequency of said mixing pulse train during said first partial measurement and the repetition frequency of said mixing pulse train during said second partial measurement is identical to a difference between said first repetition frequency and said second repetition frequency.

86. The apparatus of claim 81, wherein
said first light detecting means and said second light detecting means are implemented as a single light detecting means configured and adapted for collectively detecting said measurement light pulse train and said reference light pulse train and for generating said first and second detection signals as a common detection signal, and said at least one signal mixing means are implemented as a single signal mixing means configured and adapted for collectively subjecting said measurement light pulse train and said reference light pulse train to said signal mixing.

87. The apparatus of claim 86, configured and adapted for effecting said signal mixing at said single light detecting means at which said reference light pulse train and said measurement light pulse train are collectively detected.

88. The apparatus of claim 86, configured and adapted for effecting said signal mixing along a common path of said measurement light pulse train and said reference light pulse train anterior to said single light detecting means.

89. The apparatus of claim 86, comprising low-pass filtering means configured and adapted for subjecting said common detection signal to low-pass filtering.

90. The apparatus of claim 81, wherein said first light detecting means and said second light detecting means are separately implemented.

91. The apparatus of claim 90, wherein said at least one signal mixing means comprises a first signal mixing means configured and adapted for subjecting said reference light pulse train to said signal mixing at said first light detecting means and a second signal mixing means configured and adapted for subjecting said measurement light pulse train to said signal mixing at said second light detecting means.

92. The apparatus of claim 90, wherein said at least one signal mixing means comprises a first signal mixing means configured and adapted for subjecting said reference light pulse train to said signal mixing anterior to said first light detecting means and a second signal mixing means configured and adapted for subjecting said measurement light pulse train to said signal mixing anterior to said second light detecting means.

93. The apparatus of claim 90, comprising first and second low-pass filtering means configured and adapted for respectively subjecting said first and second detection signals to low-pass filtering.

94. The apparatus of claim 81, comprising, as said light emitting means, a laser diode configured and adapted for operating in spiking mode for generating said intensity modulated train of emitted light pulses.

95. The apparatus of claim 81, configured and adapted for generating said intensity modulated train of emitted light pulses with a repetition frequency higher than that necessary for an unambiguous measurement of a predetermined maximal measurement distance.

96. The apparatus of claim 81, wherein said first and second light detection means constitute said at least one signal mixing means, and said apparatus is configured and adapted for applying said mixing pulse train to said light detection means such that a signal conversion factor of said light detection means is modulated in accordance with said mixing pulse train and said detected light pulse trains are converted, via impulse mixing with said mixing pulse train in said light detection means, to an intermediate frequency range having a stretched time scale.

97. The apparatus of claim 81, wherein:

said at least one signal mixing means comprises one or more optical, electrical or optically controlled switches and/or amplifiers respectively situated in a respective optical path of said reference light pulse train and said measurement light pulse train anterior to said first and second light detecting means, and said apparatus is configured and adapted for respectively activating/deactivating said switches/amplifiers in accordance with said mixing pulse train such that said reference light pulse train and said measurement light pulse train are converted, via impulse mixing with the mixing pulse train, to an intermediate frequency range having a stretched time scale prior to said detection thereof by said first and second light detecting means.

98. The apparatus of claim 81, comprising:

one or more respective avalanche photodiodes as said first and second light detecting means and said at least one signal mixing means, wherein said one or more avalanche photodiodes are configured and adapted for modulating an amplification factor of the avalanche photodiode via superimposition of said mixing pulse train as a voltage impulse train onto a depletion layer bias voltage of said avalanche photodiode.

99. The apparatus of claim 98, configured and adapted for adapting said bias voltage such that the superimposition of the mixing pulse train yields temporally short, sharp, cyclical increases in said amplification factor.

100. The apparatus of claim 81, configured and adapted for generating said intensity modulated train of emitted light pulses and said mixing pulse train such that a difference between their respective repetition frequencies lies a range from 0.5 to 10 kHz.

101. The apparatus of claim 81, configured and adapted for generating said intensity modulated train of emitted light pulses and said mixing pulse train such that a difference between their respective repetition frequencies lies a range from 0.8 to 2,0 kHz.

102. The apparatus of claim 81, configured and adapted for generating said intensity modulated train of emitted light pulses and said mixing pulse train such that a difference between their respective repetition frequencies is 1 kHz.

103. The apparatus of claim 81, configured and adapted for generating said intensity modulated train of emitted light pulses such that said repetition frequency thereof lies a range from 10 to 400 MHz.

104. The apparatus of claim 81, configured and adapted for generating said intensity modulated train of emitted light pulses such that said repetition frequency thereof lies a range from 50 to 300 MHz.

105. The apparatus of claim 81, configured and adapted for generating said intensity modulated train of emitted light pulses such that said repetition frequency thereof is approximately 200 MHz.

106. The apparatus of claim 81, configured and adapted for generating said intensity modulated train of emitted light pulses and said mixing pulse train such that their respective duty factors are identical and lie in a range from 1% to 10%.

107. The apparatus of claim 81, configured and adapted for generating said intensity modulated train of emitted light pulses and said mixing pulse train such that their respective duty factors are identical and lie in a range from 3% to 6%.

108. The apparatus of claim 81, configured and adapted for generating said intensity modulated train of emitted light pulses and said mixing pulse train such that their respective duty factors are 5%.

109. The apparatus of claim 81, wherein said signal processing and evaluation means is configured and adapted for:

superimposing a plurality of said pulse trains converted to an intermediate frequency over each other for improving a signal-to-noise ratio, and employing a respective reference pulse of each intermediate frequency pulse train as a trigger signal.

110. The apparatus of claim 81, configured and adapted for determining a true distance of distances that exceed the range of unambiguity for the frequency given by the operating parameters by:

conducting a second measurement run, wherein said intensity modulated train of emitted light pulses and said mixing pulse train are generated such that their respective repetition frequencies are changed by the same, small amount in terms of their frequency vis-à-vis a first measurement run such that, during both measurements, the same absolute number of cycles results within a predetermined, maximal measuring distance ($d_{max}$), and subsequently determining an absolute value of said number of cycles via a rounding process.

111. The apparatus of claim 110, configured and adapted for increasing accuracy and reliability of the determination of the number of cycles by carrying out further measurement runs, wherein relative cycle number or cycle number differences ($n_1-n_x$; x=1, 2, 3 . . . ) are determined in accordance with the further frequency difference values relative to a first selection of repetition frequencies of said intensity modulated train of emitted light pulses and said mixing pulse train, until an absolute cycle number can be reliably determined.

112. The apparatus of claim 111, wherein said signal processing and evaluation means is configured and adapted for determining said distance using said reliably determined absolute cycle number.

* * * * *

UNITED STATES PATENT AND TRADEMARK OFFICE
CERTIFICATE OF CORRECTION

PATENT NO. : 6,917,415 B2  
APPLICATION NO. : 10/284223  
DATED : July 12, 2005  
INVENTOR(S) : Torsten Gogolla et al.

Page 1 of 1

It is certified that error appears in the above-identified patent and that said Letters Patent is hereby corrected as shown below:

On the Title Page, Item {73} Assignees should read:
    Hilti Aktiengesellschaft, Schaan (LI)
    Jenoptik Laser, Optik, Systeme GmbH, Jena (DE)

Signed and Sealed this

Sixteenth Day of October, 2007

JON W. DUDAS  
*Director of the United States Patent and Trademark Office*